(12) United States Patent
Krah

(10) Patent No.: US 12,497,139 B2
(45) Date of Patent: Dec. 16, 2025

(54) DIVER PROPULSION DEVICE

(71) Applicant: Drew Allen Krah, Vashon, WA (US)

(72) Inventor: Drew Allen Krah, Vashon, WA (US)

(73) Assignee: Drew Allen Krah, Vashon, WA (US)

( * ) Notice: Subject to any disclaimer, the term of this patent is extended or adjusted under 35 U.S.C. 154(b) by 485 days.

(21) Appl. No.: 17/948,926

(22) Filed: Sep. 20, 2022

(65) Prior Publication Data

US 2023/0038648 A1 Feb. 9, 2023

Related U.S. Application Data

(60) Provisional application No. 63/474,364, filed on Aug. 9, 2022.

(51) Int. Cl.
*B63B 32/60* (2020.01)
*B63B 32/57* (2020.01)

(52) U.S. Cl.
CPC .............. *B63B 32/60* (2020.02); *B63B 32/57* (2020.02)

(58) Field of Classification Search
CPC .... B64C 3/00; B64C 3/10; B64C 3/14; B64C 31/00; B64C 3/26; B64D 3/00; B64D 3/02
USPC .............................................. 114/315, 55.56
See application file for complete search history.

(56) References Cited

U.S. PATENT DOCUMENTS

| 621,465 A | 3/1899 | Storms |
|---|---|---|
| 1,186,413 A | 6/1916 | Merrill |
| 1,324,687 A | 12/1919 | Newby |
| 2,195,527 A | 4/1940 | Whiting |
| 3,377,977 A | 4/1968 | Malm |
| 3,718,109 A | 2/1973 | Skitsko |
| 4,304,555 A | 12/1981 | Gander |
| 4,464,126 A | 8/1984 | Maisonneuve |
| 4,872,861 A | 10/1989 | Gaudin |
| 4,898,345 A | 2/1990 | Clayton |
| 4,936,802 A | 6/1990 | Ueno |

(Continued)

OTHER PUBLICATIONS https://www.youtube.com/watch?v=L_ThKqGJ0Y4 "Don't Buy a Underwater Scooter before you see this video—Hoverstar AquaJet Dive H2" uploaded to youtube Aug. 25, 2019. screen shot from youtube video included. (Year: 2019).*

(Continued)

*Primary Examiner* — Anthony D Wiest
(74) *Attorney, Agent, or Firm* — Lowe Graham Jones PLLC

(57) ABSTRACT

Diver propulsion devices and methods of propelling the devices and divers upon and beneath the sea are presented. A diver propulsion device is comprised of a wing buoyant in water, an electric motor propulsion system, a leash interconnecting the wing and diver, which leash may integrate control circuitry of the motor, photovoltaics atop the wing, and, batteries, each electrically connecting the motors, fins attaching the wing provide hydrofoil flight stabilization, and foot constraints attaching a deck of the wing. The wing is a hydrofoil, and the diver stands and lies upon the deck of the wing, and, during hydrofoil flight, the diver is substantially above the sea and the wing is seaborne. In hydrofoil flight, the device may be motor propelled, or, by the diver heaving and pitching the device, or, by both methods simultaneously. Undersea, the device tows the diver by motor power energized photovoltaically, and, or, by battery.

6 Claims, 19 Drawing Sheets

(56) References Cited

U.S. PATENT DOCUMENTS

Figure 1B:
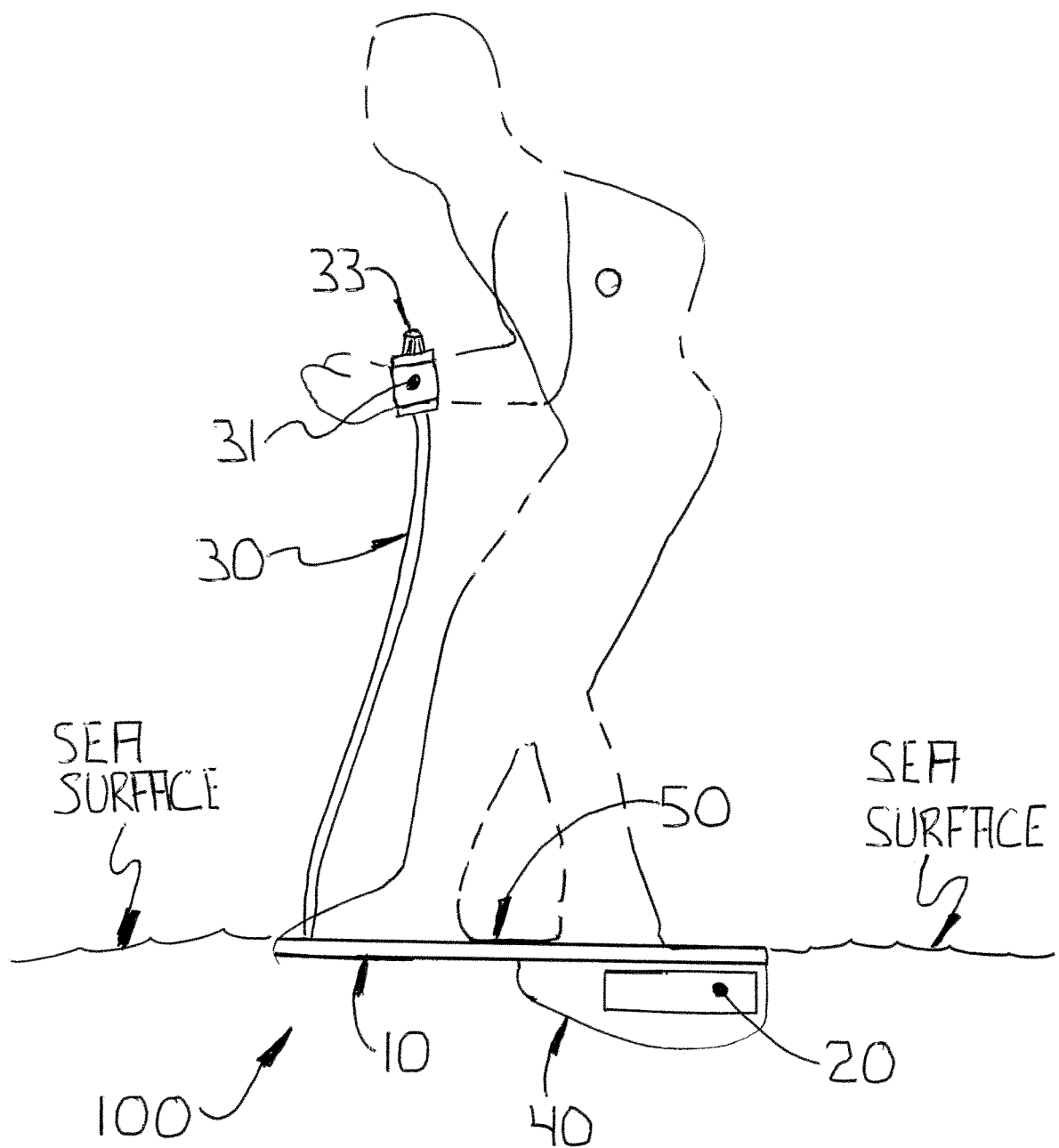

| | | | |
|---|---|---|---|
| 4,968,273 A | 11/1990 | Momot | |
| 5,062,378 A | 11/1991 | Bateman | |
| 5,127,855 A | 7/1992 | Heywood | |
| 5,194,024 A | 3/1993 | Shiraki | |
| 5,323,727 A * | 6/1994 | Heaton | A63B 35/12 114/242 |
| 5,357,894 A * | 10/1994 | Jacobson | B60V 1/22 114/272 |
| 5,429,536 A | 7/1995 | Evans | |
| 5,469,803 A * | 11/1995 | Gallo | A63B 35/12 440/38 |
| 5,509,372 A * | 4/1996 | Culotta | B63C 11/46 440/6 |
| 5,549,491 A | 8/1996 | Domancic | |
| 5,740,750 A | 4/1998 | Triantafyllou et al. | |
| 5,816,871 A | 10/1998 | Proverbio | |
| 6,022,249 A | 2/2000 | Ketterman | |
| 6,033,276 A | 3/2000 | Han | |
| 6,099,369 A | 8/2000 | Puzey | |
| 6,102,760 A * | 8/2000 | Seigler | B64C 31/02 441/68 |
| 6,468,118 B1 | 10/2002 | Chen | |
| 7,004,099 B2 * | 2/2006 | Iijima | B63G 8/36 114/242 |
| 7,232,350 B1 | 6/2007 | Krah | |
| 7,736,205 B2 | 6/2010 | Krah | |
| 7,988,508 B2 | 8/2011 | Langenfeld et al. | |
| 8,043,134 B2 | 10/2011 | Krah | |
| 9,789,935 B1 | 10/2017 | Aguera | |
| 12,167,724 B2 * | 12/2024 | Allmendinger | B63C 9/00 |
| 2001/0025594 A1 * | 10/2001 | Daniels | B63B 34/10 114/333 |
| 2014/0378013 A1 | 12/2014 | Palairet | |
| 2015/0266573 A1 | 9/2015 | Wypyszynski | |
| 2016/0332706 A1 | 11/2016 | Martens | |
| 2017/0283015 A1 | 10/2017 | Langelaan | |
| 2021/0347442 A1 * | 11/2021 | Montague | B63B 1/28 |

OTHER PUBLICATIONS

Schuck, Dr. Julius, "Wasserlaufer;" YouTube link https://www.youtube.com/watch?v=TwgCUeMY17c.

\* cited by examiner

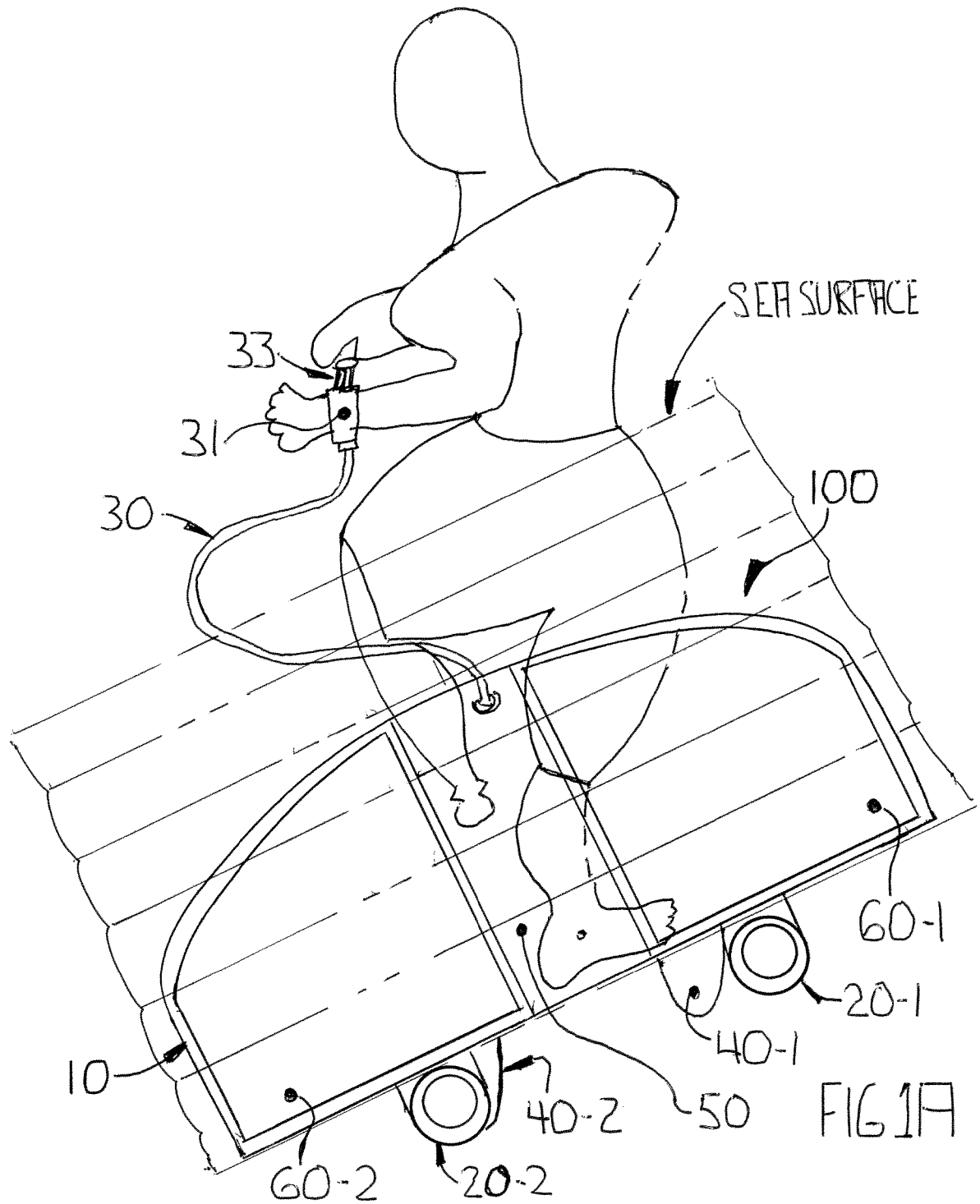

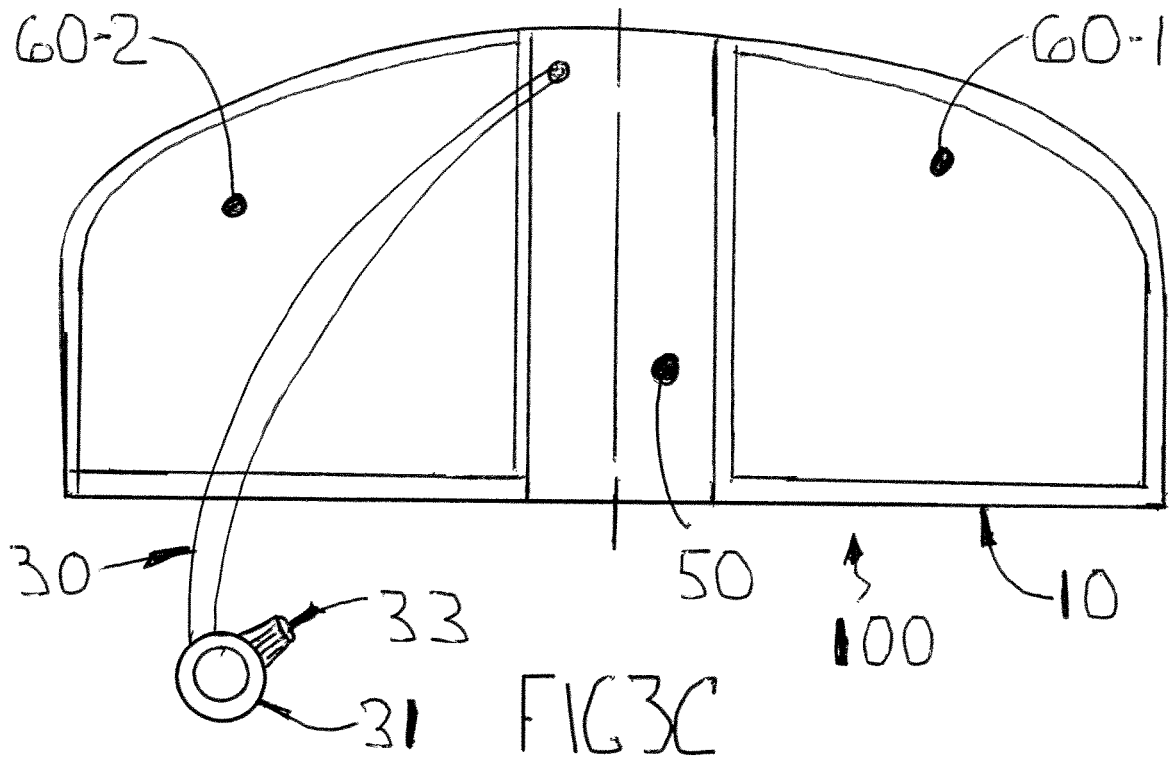
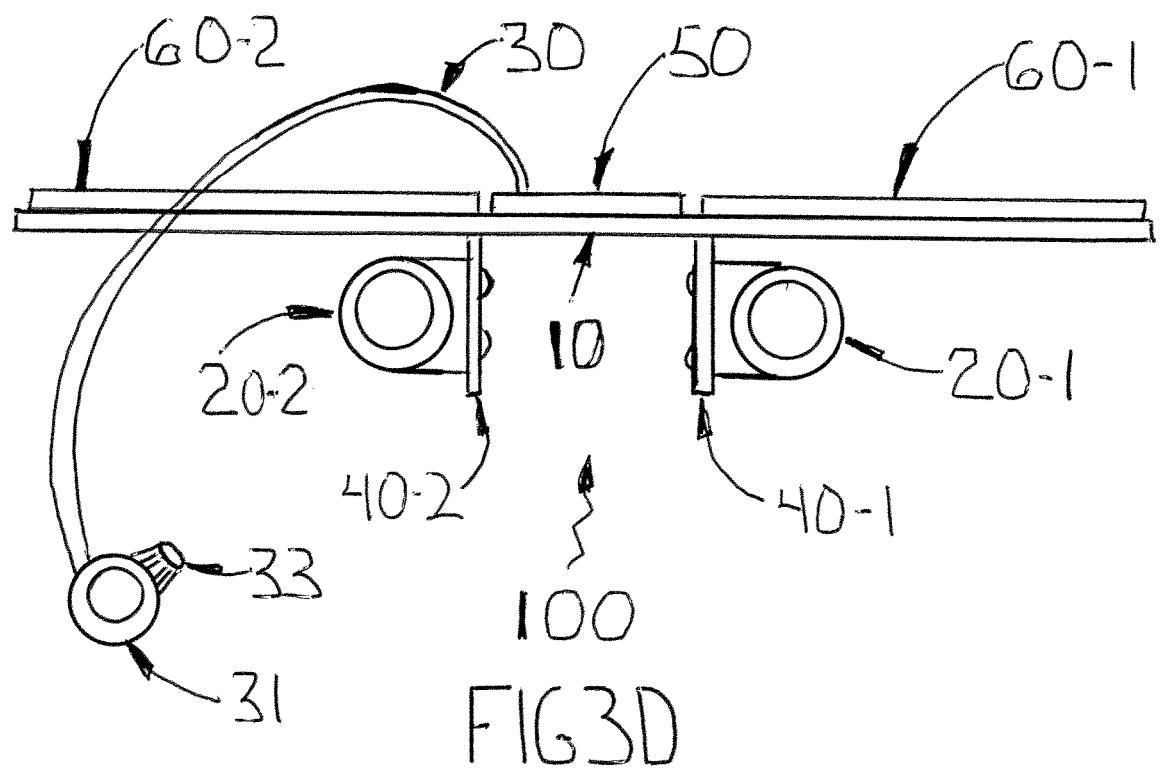

DIVER PROPULSION DEVICE

CROSS REFERENCE TO RELATED APPLICATIONS

This regular utility nonprovisional patent application claims the benefit of regular utility nonprovisional patent application Ser. No. 16/602,466 having a filing date of Oct. 12, 2019, presently in appeal with the USPTO, for the invention titled Human Powered Watercraft, by this inventor, the entirety of which is incorporated herein in full by reference, and further claims the benefit of provisional patent application 63/474,364 having a filing date of Aug. 9, 2022, for the invention titled Diver Propulsion Device, by this inventor, the entirety of which is incorporated herein in full by reference.

BACKGROUND

Divers, swimmers, surfers and boaters, men and women, waterman all, go down to the sea to commune with nature, to see the grandeur of creation, to take respite in that sanctuary of solitude. Be they mission professionals, athletes in training, thrill-seekers, or even just tourists of paradise, when they enter the sea, they invariably test the limit of their human engine in a compelling but unforgiving ocean. So thrilling and sensational is the ocean that she tempts us beyond our normal reserves of strength and stamina, and we then often put ourselves in life-peril, and, fatigued and weakened, are unable to return to the haven of land or even to a nearby dive boat. To help the waterman, the swimmer, the diver so compromised and weakened, a new diver propulsion device must be able to assist the waterman in the sea, and power them back to shore or the dive boat and must be able to transport them quickly and safely upon the sea surface at faster than strong swimming speeds, but also must be able to dive below the surface of the sea and to tow the diver safely but also stealthily under the sea again at faster than strong swimming speeds.

What is therefore needed is a diver propulsion device that is able to hydrofoil fly the diver at and above the sea surface with speed surpassing swimming speeds, and also is able to tow the diver under the sea safely and even stealthily but, also at greater than swimming speeds.

BACKGROUND STATE OF THE TECHNICAL ART

Diver propulsion vessels and devices fall into five broad categories as explained here following; they are 1) mini-submersibles, 2) diver tugs, 3) hydrofoils, 4) hydrofoil-surfboards, and 5) hydrofoil swim-fins.

Mini-submersibles: Mini-submersibles and mini-submarines currently in the market most notably are the STIT submersible which can seat two divers and is sized roughly 8 feet by 2.5 feet by 2.5 feet and is in use by US Navy divers and is itself a special mission vehicle. Speed and costs unknown, its weight exceeds 250 pounds, and requires two stout men at least to portage.

The mini-submersible Mako is a powered and semi-autonomous dive-sled of dimensions roughly 7 feet by 2 feet wide by 1 foot in height upon which a diver or two may lie. Its weight exceeds 200 pounds and its costs well exceeds $250,000.

Both of the above mini submersibles although they may transport a diver undersea with stealth, they cannot fly a diver upon the sea surface or above the sea surface. No mini-submersible, no mini-sub can fly a diver or swimmer at the sea surface. Both STIT and Mako are special duty vessels and are open to the sea, wet. They dive below the sea surface and operate there for maximum stealth. They are complex, expensive to acquire, expensive to operate requiring substantial maintenance to maintain operability.

Diver tugs: Since the late 1940s, diver tugs have been available on the market. They are notoriously heavy, expensive, and weakly powered, and of limited battery life. Consisting of a sealed electric motor, a very large battery, propellor and handles, they are quite tiresome to carry on land, and are extremely difficult to lug-swim back to safety when their batteries have died. Often, a diver will put himself in peril-of-life by trying to lug-swim a dead tug back to shore; some make it, some perish.

Currently available diver tugs are: Yamaha-RDS, capable of 3-4 MPH; Lefeet-S1, having three speed settings but no published velocity data; Sub-blue, Whiteshark, claiming a speed of up to 3 MPH; Torpedo-3500, claiming 3.5 MPH capability; Aquaprop L Scooter, claiming 2 MPH and depth of as much as 262 feet; TUSA-SAV-7-EVO3, claiming 2.8 MPH.

None of these noted tow tugs are capable of hydrofoil-flying a diver above the sea surface since none have any wing or lifting body; they may only tow the diver in the sea. All these tow-tugs have very limited battery life of less than 90 minutes at full power, and, have no on-board recharging capability whilst in the sea.

Hydrofoils: Human powered hydrofoils such as Trampofoil, Pump-a-bike, and Water-skippy are made up of tricycle space-frames whether welded metallics or laminated composites; each has a stand pedestal and handle-bars with which to steer the vessel whilst the user bounds up-and-down on the pedestal, and a broad wing below the sea-surface is urged to oscillate up and down in the water to urge the device and user forward. These devices hydrofoil-fly the user above the sea, but cannot tow the user beneath the sea surface, and they cannot be water-started from a dead stop in the sea. These then must again be lug-swum back to shore when stopped. Again, these devices cannot tow a user sub-sea.

Hydrofoil-surfboards: Hydrofoil-surfboards are made up of a small surfboard attaching a stanchion which projects out of the bottom of the surfboard and, at the lower end of the stanchion, a wing attaches, the stanchion is variously 2 to 4 feet in length below the surfboard. In flight, the user is precariously perched atop the surfboard and above the sea by as much as the full length of the stanchion, the wing being submerged just below the sea surface. Because the moment arm of the user above the wing is as great as the stanchion length, the user is quite unstable atop the device and any slight move may upset the wing in the water and cause a fall, which fall can be quite dangerous to the user since he or she may fall upon the exposed sharp wingtip of the device. These devices not only cannot be water-started from a stop but are also incapable of towing the user below the sea surface. This is because when fitted with a motor-propulsor, the motor propulsor must be proximate the hydrofoil wing putting the propulsor and the rider at great distance, the moment arm of which makes towing the user sub-sea surface infeasible. Recapping, hydrofoil-surfboards cannot tow a user below the sea surface.

Hydrofoil swim-fin systems: Hydrofoil swim-fins for divers attach a hydrofoil wing or fin to a diver at the feet so to increase swimming speeds and also to reduce exertion of the diver at a given speed of swimming. They are made by incorporating a foot receptacle and integrating to that a broad wing with a very short chord, making a high aspect-ratio propulsor which the diver genuflects to oscillate thru the water and urge himself forward. Exemplars of these are Aqueon by the hydrodynamicist Calvin Gongwer, and Dol-Fin by Smith aerospace. Truly efficient devices, they cannot fly a user above the sea surface, and also, as the span of the fin or wing increases, these devices become more likely to entangle in-situ vegetation when swimming in the sea. Again, these devices cannot hydrofoil fly a user at or above the sea surface.

Summarizing the known technical art, not one of these extent devices or vessels combines the ability to both hydrofoil-fly the user at the sea surface and tow the user below the sea surface. Some can fly the user but cannot tow the user below the sea; others can tow the user below the sea but cannot hydrofoil-fly the user above the sea surface. No known device or vessel combines the ability to hydrofoil-fly a user above the sea surface with the ability to tow the user below the sea surface.

Thus, a long and history-spanning unmet need exists for a simple diver propulsion device which can tow a diver below the surface of the sea at faster than swimming speed and may also hydrofoil-fly a diver upon and above the sea surface, again at faster than swimming speed. Such a device will be useful for self-rescue of a diver; will be useful to mission professionals approaching hostile and un-permissive shores; will be useful to rescue swimmers and lifeguards; will be useful for self-rescue of those forlorn boaters whose vessels have slipped down into the sea; and will be useful for recreation and professional pursuits of divers and surfers, marine biologists and other scientists.

SUMMARY OF THE INVENTION

The diver propulsion device of this invention disclosure may use the technology of regular patent application Ser. No. 16/602,466 for Human Powered Watercraft; in particular, this diver propulsion device may use the Human Powered Watercraft of the foregoing patent application, Ser. No. 16/602,466, in its structure, form and method of use, and this diver propulsion device is further comprised of a hydrofoil wing which wing is buoyant in water, and the wing is of scale sufficient to hydrofoil-fly a diver above the sea surface when the diver propulsion device is operated in a high-speed hydro-foiling mode upon the surface of the sea, during which the diver stands upon or is situated upon, for example lying or kneeling upon the deck of the wing. When standing upon the deck of the wing and hydrofoil-flying the device, the diver is substantially above the sea surface with only the lower leg portions wetted by the sea, and the diver propulsion device is seaborne. Now, because the wing is large in planform area the diver propulsion device flies at slow speeds of 4 to 7 miles per hour which is itself desirable since low flight speed induces low drag, and the wing of the diver propulsion device may be heaved and pitched by the diver to achieve that low speed flight. Even divers of average athletic ability may sustainably heave and pitch to hydrofoil-fly the device. Counter-intuitively large wings allow slow flight and slow flight speed induces low drag and low drag enables long flight durations whether flight is by human-power or electromotive propulsion, or both combined simultaneously. That is, big wings equal good wings.

The wing of the diver propulsion device has at least one stabilizing device, typically but not limited to a single fin. In some preferred embodiments of the diver propulsion device, a propulsion motor may suffice to provide lateral stability to the diver propulsion device. In other preferred embodiments of the device, numerous fins provide lateral stability, and in other preferred embodiments of the invention, a plurality of electric motor propulsors provide the needed lateral stability to the diver propulsion device.

For the safety of the diver, the top surface of the wing of the diver propulsion device is un-limitingly preferred to be clear of any projection. In that way, should the diver fall upon the device, there is no hard or even soft projection for the diver to fall upon, and therefore, if the diver falls upon the wing, injury by blunt impact is avoided. That is to say, in many of the preferred embodiments of the invention, the motor-propulsory, and the stabilizing fins, and any other projection from the wing are without limitation projecting whether as hard or soft projections from the lower surface of the wing. In any case, however, in the case of a projection from the wing upper surface, it should be both soft and rounded so to protect the diver.

The stabilizing devices of the preferred embodiments of the invention, be they fins or be they propulsion motors be they below the wing or be they above the wing, are oriented at predetermined orientation angles with respect to the wing. The fins and motors are oriented parallel the short axis of the wing of the device; that-is to say they are oriented from leading edge to trailing edge of the wing which is parallel the chordal orientation of the wing. Furthermore, the stabilizers are optimally situated such that they project orthogonally from the wing lower surface, that is to say, ninety degrees with respect to the surface, upper or lower of the wing, that is vertical from the wing surface. Likewise, the propulsion motors are optimally parallel the chordal axis of the wing and are mounted underwing, and preferably are closely situated the wing lower surface, and so provide little if no destabilizing moment.

The over-arching dual functionality of the diver propulsion device of this invention disclosure is in its ability to both hydrofoil-fly the diver above the sea surface and also to dive below the sea surface and to tow the diver beneath the sea. These dual modes of transporting the diver integrated in one diver propulsion device, in one watercraft make this device distinct from all other watercraft. This device is both a hydro-foiler and a submersible, and is of surpassing stability in hydrofoil flight as explained following.

Five Stabilizing Factors of the DPD

Firstly, the very short distance from the centerline of the propulsion motors to the wing center of drag, and to the diver center of gravity and center of drag means that there is very little if any destabilizing overturning moment applied the system, and so, this factor un-obviously contributes to system stability and diver stability upon the device. Whether towing the diver undersea, or, hydrofoil-flying the diver upon the surface of the sea the device is very stable.

Secondly, the buoyant wing of the diver propulsion device is of span-wise size and chordal dimension such that a very massive amount of water resides both below and above the wing which especially during hydrofoil flying of the diver make the device even more stable. That this factor and the noted short coupling between wing and motors are completely surprising causes of the astounding stability of the device while hydro-foiling the diver above the sea surface.

Thirdly, during hydrofoil flight, the diver stands directly upon the deck of the wing of the device, and the device is seaborne, at most flying atop the surface of the sea; Now, because the diver is standing upon the deck of the wing and because the wing is in the water, the center of gravity of the diver is low with respect to the wing and with respect to the surface of the sea, making the device yet again more stable.

Fourthly, another factor increasing rider stability upon the device is the presence upon the deck of the wing of traction enhancing devices for example, but not limited to surf-wax on the deck of the wing, deck-tread devices, and foot-straps. In all, these four stability factors give the device seemingly majestic stability, and thereby encourage the diver to quickly master the use and propulsion of the device, be that usage motor-propelled or human-powered, or, simultaneously motor-propelled and human-powered via heave and pitch of the device, by the diver.

Fifthly, and lastly, another factor increasing stability for the diver upon the deck of the wing of the diver propulsion device is in the diver being able to see the sea surface without any limit except the horizon and any approaching large swells. The diver whilst standing upon the deck of the device, in effect stands upon the surface of the sea and can see all conditions of the local sea surface, while at the same time the wing being seaborne and typically just below the sea surface is unperturbed by small waves, sea-chop and wind waves, making the diver riding experience one of placidity and great stability.

Now going on, the larger the wing in span and the greater the wing in chord dimension, the slower may the device go and yet fly. That in going slowly, the drag of the system in use is greatly reduced. There is no great advantage in increased thickness of the wing and indeed plywood of roughly ½ inch thickness suffices for strength to support even a 250 pound rider. Increasing wing thickness beyond sufficiency for strength brings only added drag, that is to say, section drag. So, it is advantageous that wing buoyancy be sufficient to float the device to the surface under all eventualities, but not do so quickly. Yet, it is of enduring concern to watermen that they quickly re-unite with their device, and so, a hand tether, a leash interconnecting diver and wing is extremely beneficial.

In many preferred embodiments of the device, a leash interconnects the wing and the diver. The leash enables the diver to keep connected to the device and after a fall, to draw the device back to oneself. This is a very important safety feature of the invention as a low buoyancy device will often slowly flutter surface-ward and so escape initial visual acquisition by the diver. Whereas, leash connected to the wing, and the diver connected to the leash, the diver can simply tug the wing toward herself and quickly regain the device.

The leash of the device may comprise a releasable wrist-strap, and may also integrate control-circuitry, which may be hard-wired, that is electrically connected the motor, and alternatively, may also include radio communication devices inclusive of radio antennae to communicate with and control the motors of the device. The leash may connect the wing proximate the leading edge of the wing and approximate a center-of-span portion of the wing, and so, enable the diver to uphaul upon the leading edge of the wing to urge the wing surface-ward during hydro-foiling flight. In other preferred embodiments, the leash may jut between the legs of the diver, and anchor to the wing at about a ¼ to ⅓ chord-line and between the spaced apart feet of the diver standing upon the deck.

The diver propulsion device of this invention disclosure employs a wing of planform area quite large. This in turn enables hydrofoil flight of the device and the diver riding upon the deck of the wing at speed deliberately slow, although surpassing walking speeds, faster than strong swimming speeds, but slowly enough that induced drag is quite low. Thus, the wing in flight has very low drag. The planform area of the wing can vary dependent upon the weight of the diver and so can vary from as little as three feet wingspan to as great as 10 feet wingspan, while chord lengths, the short axis of the wing design may very from as little as 10 inches to as much as 36 inches and may also exceed 36 inches chord length in places. The resultant planform area of the wing may vary from as little as 3 square feet to as much as 20 feet squared planform area, depending design-wise upon total diver weight, total motor power, the desired towing speed and the desired hydrofoil-flying speed.

Most divers and swimmers, surfers too operate predominantly during daylight hours. Therefore, it is possible to power the diver propulsion device propulsion system by incident solar radiant energy, the radiant energy captured and harvested by on-board solar energy collectors. In preferred embodiments of the invention, the top surface of the wing integrates at least one solar energy collector, in other words, at least one solar array, and the solar collector if large enough, for example one square meter of solar array, collecting, harvesting incident solar energy of up to nearly two horse-power of incident radiation at up to as much as 20 percent efficiency, yielding available harvested power of up to 0.40 horsepower during bright daylight hours when the device is operated at or near the surface of the sea. In cold waters and during periods of high incoming solar radiation, the efficiency of the solar arrays may increase somewhat above 20 percent efficiency.

The solar collector arrays may not only power the propulsion motors of the device but may indeed charge the batteries also. The solar arrays may be of at least two different types; silicon-based arrays, and perovskite-based arrays. Both types of arrays are very flexible and may be adhered to the top surface of the wing even if the wing is of a convex top surface, and also, if the top surface of the wing is defined by NACA wing sections of between NACA0001 thru NACA0020 wing sections. The solar collectors may almost completely occupy the large wing-span area although not the deck of the wing which interfaces with the lying and standing diver. Ideally, the solar array is very nearly as large in area as is the available planform area of the wing, except not including the deck area of the wing which is where the diver either stands or lies. The arrays may be adhesively bonded and may also fixedly attach to the wing and may even be directly printed upon the wing top surface, printing perovskite solar arrays directly upon the smoothened surface of the wing top surface.

The diver propulsion device of this disclosure expands utility beyond conventional diver tow devices by enabling not only towing of the diver below the sea surface, but adding to this also, hydrofoil-flying of the diver upon and above the sea surface, with the diver standing, or kneeling upon the deck of the wing with the device itself being seaborne. That this expanded utility to both hydrofoil-fly and to tow subsea enables speed to and from a position and, also stealthily below the sea once a position has been attained.

The diver propulsion device of this disclosure expands utility beyond the conventional utility of hydrofoil surfboards and also human-powered hydrofoils in that those devices cannot dive below the sea surface to tow a diver whereas this diver propulsion device can both hydrofoil-fly the diver upon the sea surface and can also tow the diver below the sea surface.

The diver propulsion device of this disclosure expands utility beyond the utility of mini-submarines and mini-submersibles in that mini-subs cannot hydrofoil-fly a diver above the sea surface whereas this invention can not only do that but can also stealthily deliver a diver under the sea via towing of the diver into prohibited areas stealthily under the surface of the sea, but not only that, this device is both easily hand-carried by the diver under one arm, but too is inexpensive. And it should be apprehended by even casual readers that the standing diver hydrofoil-flying above the sea surface is substantially guarded from shore-based radar systems by the the swell action of the sea and wave chop scattering most if not all radar energy so as to make the diver undetectable both far out the littoral seas and near the shore even when hydrofoil-flying upon the sea surface The diver propulsion device of this disclosure is clearly of greater utility than that of enhanced swim fins as enhanced swim fins cannot fly a diver above the sea surface as this device can so do.

The wing of the diver propulsion device may be constructed substantially of plywood and covered with water resilient spar-varnish. The wing may be of a composite construction consisting of a polymeric foam and covered by fiberglass and adhesive resin, as well as alternatively being covered by carbon fiber reinforced adhesive resin. Generally, if thicker than ½ inch, and with wingspans nearly 8 feet, and chordal dimensions nearly 2.5 feet, the wing becomes cumbersomely heavy if constructed as solid plywood, though the excess weight of a large plywood wing may be ameliorated by careful positioning of cutouts thru the plywood, and the cutouts then filled with lightweight foam, in turn laminated over by fiberglass and adhesive resin.

It is an explicit object of this diver propulsion device that the wing of the device be optimized in wing planform area, wing-span, wing-chord, and thickness of wing to enable flight of the device and its user, the diver, at very low and aerobically sustainable speeds when heaved and pitched to propel the device by the diver. To achieve this optimization, generally the wing should be roughly head-height the diver plus or minus 18 inches, and the wing chord should be shoulder-width the diver plus or minus 12 inches, and the wing thickness should be as thin as is structurally viable. For example, a 6 feet tall man of roughly 170 pounds can expect that a wing of wingspan roughly 6 feet plus or minus 18 inches and of chordal dimension roughly 30 inches plus or minus 12 inches will provide needed planform area to fly with little exertion by the diver during heave and pitch of the wing of the diver propulsion device. Flight of the device should commence at or above about 4 MPH. Plywood which is ½ inch thick has been shown by the inventor to be structurally adequate with no reinforcement to fly a 250-pound man. Note that in some preferred embodiments the plywood wing may be fully or partially covered with fiberglass deck-cloth and adhesive resin so to allow a finely polished surface all around the wing, reducing surface drag.

With chordal lengths of the wing of the device at or about shoulder width the diver, most people can carry the device under one arm. If needed to facilitate hand-carrying, the trailing edge of the wing can be scalloped or notched at the wingspan center portion at the trailing edge of the wing so to allow the fingers of the diver to wrap around the trailing edge, and, with the leading edge tucked under the arm pit of the diver, hand carrying is very secure.

Shoulder width chordal dimensions of the wing especially at the center-of-span portion of the wing allow the diver to stand longwise to the short axis of the wing the chordal length and the diver has a very authoritative stance upon the wing and this allows very confident pumping of the wing during heaving and pitching of the wing of the device for human powered propulsion through the seas.

Surprisingly, with a hydrofoil wing of about head-height the diver and about shoulder width the diver, there is no need for any horizontal stabilizer. This reduction in part count reduces costs to the consumer and also, but surprisingly increases safety of use to the diver since no small part may impact the diver during a fall from hydrofoil flight, when the wing is smooth on the top surface of the wing, that is free of projections.

However, adding vertical fins to the bottom of the wing of the device is very effective to laterally stabilize the wing for the diver situated upon the deck of the wing especially during hydrofoil flight of the diver whether during heave and pitch propulsion of the device by the diver, or by motor propulsion of the device. Minimizing the potential for harm to the diver is paramount. The fins also serve as excellent mounting points of the propulsion motors, and well hide the motors under the wing. Recapping, but without limitation, it is preferred that any projections from the wing be projections from the under wing, and this for the safety of the divers.

With the propulsion motors attached to the vertical fins, and under the wing, another factor of importance is to space apart the fins, typically two fins so that the motors are situated wider than the hip-width of the diver, thus allowing the water jets of the propulsion motors to pass by the diver without the jet flow being disrupted or enturbulated as it passes the diver. This maintains the highest possible efficiency of the motor propulsors, and so enables both the highest speeds and the least consumption of electric energy in use.

The propulsion motors may attach the fins via simple removable screws or band-clamps, among many other means of attachment.

Commensurate with the foregoing figures, and descriptions, the following are presently preferred embodiments of the invention which nevertheless, should be considered to be illustrative of the invention but not limiting of the protected aspects of the invention.

In a first preferred embodiment of the invention, the diver propulsion device of this disclosure is comprised of A) a wing buoyant in water, and B) an electric motor propulsion system attaching the wing of the diver propulsion device, the electric motor propulsion system having at least one electric motor propulsor.

In a second preferred embodiment of the invention, the diver propulsion device is comprised of A) a wing buoyant in water B) an electric motor propulsion system comprised of at least one electric motor propulsor and C) a releasable leash interconnecting the wing and the diver.

In a third preferred embodiment of the invention, the diver propulsion device is comprised of A) a wing buoyant in water, B) an electric motor propulsion system, C) a releasable leash interconnecting the wing and the diver, and the releasable leash further integrates a control circuit of the electric motor propulsion system of the diver propulsion device.

In a fourth preferred embodiment of the invention, the diver propulsion device is comprised of A) a wing buoyant in water, B) an electric motor propulsion system, C) a releasable leash interconnecting the wing and the diver, and the releasable leash further integrates a control circuit of the electric motor propulsion system of the diver propulsion device, and D) at least one fin attaching the wing of the diver propulsion device, and the at least one fin attaching the wing of the diver propulsion device fixedly attaches the wing and projects therefrom, and, the at least one fin is further selected from the list of: 1 fin, 2 fins, 3 fins, 4 fins, 5 fins, 6 fins, 7 fins, and greater than 7 fins, and each fin of the selection of fins attaching the wing is substantially parallel the other fins of the selection, and each of the fins is oriented substantially parallel a chordal direction of the wing.

In a fifth preferred embodiment of the invention, the diver propulsion device is comprised of A) a wing buoyant in water, B) an electric motor propulsion system, C) a releasable leash interconnecting the wing and the diver, and the releasable leash further integrates a control circuit of the electric motor propulsion system of the diver propulsion device, and D) at least one fin attaching the wing of the diver propulsion device, and the at least one fin attaching the wing of the diver propulsion device fixedly attaches the wing and projects therefrom, and, the at least one fin is further selected from the list of: 1 fin, 2 fins, 3 fins, 4 fins, 5 fins, 6 fins 7 fins, and greater than 7 fins, and each fin of the selection of fins attaching the wing is substantially parallel the other fins of the selection, and each of the fins is oriented substantially parallel a chordal direction of the wing, and E) a solar energy collector, and the solar energy collector is attached a top surface of the wing of the diver propulsion device, and the solar energy collector electrically connects the electric motor propulsion system of the diver propulsion device.

In a sixth preferred embodiment of the invention, the diver propulsion device is comprised of the first preferred embodiment of the invention with the added limitation that the wing is substantially flat upon a top surface of the wing and the wing is substantially flat upon a bottom surface of the wing of the diver propulsion device.

In a seventh preferred embodiment of the invention, the first preferred embodiment of the diver propulsion device is further comprised as a convex upper wing surface across the entirety of the wing of the diver propulsion device.

In an eighth preferred embodiment of the invention, the diver propulsion device is comprised of the second preferred embodiment of the invention further limited in that the leash interconnecting the wing and the diver is a releasable leash comprised of a strap, and the strap is further comprised of a hook-and-loop closure.

In a ninth preferred embodiment of the invention, the diver propulsion device is comprised of the eighth preferred embodiment of the invention with the further limitation that the strap of the leash interconnecting the wing and the diver is further comprised as an electric control knob, and the electric control knob electrically connects the control circuit of the at least one electric propulsion unit of the diver propulsion device.

In a tenth preferred embodiment of the invention, the diver propulsion device is comprised of the first preferred embodiment of the invention with the further limitation that the diver propulsion device is made up of an aggregation of materials, some of the materials being buoyant in water such that overall, the diver propulsion device is positively buoyant in water.

Although it is presently preferred that the control circuitry of the electric motor propulsion system electrically connects the electric motor of the system another preferred embodiment of the diver propulsion device includes antennae in close proximity of the motors and the motors of the electric motor propulsion system contain radio receivers, and the control circuitry integral the leash controls the power output of the motors of the system by radio signal and the motors receive those signals and are controlled thereby. This preferred embodiment nullifies the need for an aperture thru the body of the motors, thus minimizing any chance of short-circuits which may be caused by sea-water leakage into the bodies of the motors.

In another preferred embodiment of the invention, the solar collector array may be printed directly onto the upper surface of the wing, especially in the case of lately on the market perovskite-based solar collectors.

In another preferred embodiment of the invention, the solar collector array may be of silicon-based solar energy collecting cells.

Surprisingly, when operated in cool to cold waters, the efficiency performance of the solar collectors improves. Typically, solar arrays operate at efficiencies of just over 20%. During highly solar radiant times and in cool to cold waters while operating near the surface of the sea, the incident solar radiation is more efficiently converted into electromotive power to the motors of the propulsion system or to charge the batteries of the system for later use.

It is counter-intuitive to use a large wing since it is assumed that large wings create large drag forces. But no, large wings operate at slow speeds and drag increases and decreases as the square of velocity. Now, not only do large wings have low drag, they also provide large surface areas upon which to mount solar arrays. And, with a large solar array for example 1 meter square, mounted atop the wing, as much as two horse power of energy may be harvested, and, at 20 percent efficiency, that 2 horsepower converts to 0.4 horsepower, or about 746 watts times 0.4 equals nearly 300 watts per hour charging capability, and as adjunctive power to the motors in addition to on-board battery power, not to mention the ability of the diver to add human power during heaving and pitching of the wing of the device. In combination, battery power along with solar power along with human power, all in combination simultaneously, it is clear the device has many previously un-imagined methods of powering such a device since this DPD is entirely unique and new with respect to the previous state of the art.

In a preferred method of operating the diver propulsion device, the diver may heave and pitch the device at the surface of the sea, and may also use motor power to propel at the surface and the diver may choose to employ both methods of propulsion during hydrofoil flying at the surface, using both motor power and at the same time heaving and pitching the device to propel. Of course, the motors of the device during motor propulsion may be energized by battery power, the batteries integral the motor housing, and the motors may also be energized by incident solar radiation harvested the solar arrays resident the wing upper surface of the DPD.

During diving and towing of the diver below the sea surface, battery powers the motors, but solar radiation harvested by the on-board solar arrays may also adjunctively or exclusively power the motors, of course only at shallow depths beneath the surface of the sea, and of-course only when the day is bright and sunny.

In every one of the foregoing preferred embodiments of the diver propulsion device, the stated electric motor propulsion system may be comprised of one motor, two motors, three motors, and may be more. When mounted upon the stabilizing fins, it behooves that the fins themselves be attached the wing at lateral spacing such that the propulsion jets of the motor propulsors pass by the diver without impinging the diver. That is to say that the fins and the motors must be wider than the hip width of the laying diver so that the propulsion jets of water made by the motors pass by the diver with no turbulence of those water-jets. This gives the greatest propulsive efficiency which in turn gives the greatest potential battery life during use.

Every one of the foregoing preferred embodiments of the invention can be operated by divers, swimmers, surfers, boaters, even possibly clever canines, in the dual functions of hydrofoil flying at and above the sea surface and also of diver towing below the sea surface. Together, these dual modes of use of the device comprise dual modalities, dual methods of use for a watercraft which has never been done before and is neither anticipated nor suggested in any writing or publication. That is to say, this DPD is entirely new, original and unique from all previous watercraft.

Following are explanations and definitions of terms, numerals, symbols, and phrases used herein and will be useful to the reader of this disclosure for understanding and interpretation of this text and its figures.

Terms, Symbols, Numerals, and Phrases Explained

The following definition of terms and symbols, numbers and phrases should not be construed by the reader as limiting of the protected aspects of this disclosure, neither its ideation, nor the manifold derivations of this art naturally occurring to those of ordinary skill in the art as exemplified by this unique, original, first-of-its kind teaching. So follows brief explanations of those terms, symbols, numbers, and phrases:

- 100: The diver propulsion device (DPD) of this disclosure, generally comprised of a wing having a deck upon which a diver may stand, sit, and lie, at least one electric-motor propulsion unit, a leash connecting the wing and a diver, and the leash may contain electric-control-circuitry which the diver uses to control the power output of the electric-motor propulsion-unit or units, fins attaching the wing for lateral stabilization of the DPD, foot-constraining devices for example surf-wax and foot-straps upon the deck of the wing, and solar-energy collecting-arrays affixed atop the wing but outside the deck of the wing, batteries integral the electric-motor propulsion-units, and, the motors, batteries, electric-control-circuitry, and solar-energy collecting-arrays are all in electric connection. The DPD may be flown upon the surface of the sea and may be dived below the surface of the sea under the control of the diver.
- 10: The hydrofoil-wing of this disclosure; also wing.
- 20: Electric motor propulsion unit, or, electric motor propulsor, or, motor propulsor, or motor, or, propulsor, used in this disclosure; generally a watertight casing surrounding the electric motor, batteries inside the casing electrically connected the motor, an impellor connected the motor outside of the watertight portion of the casing and able to propel water, electric wiring connected both to the batteries and motor and to a sealed coaxial plug receptacle mounted to the casing and crossing from the casing internally to externally the casing to allow for electrical connection externally from for example charging, powering, and control circuitry outside of the motor casing, and radio devices and antenna for receiving control signals via radio command devices outside the motor case. Ideally, the impellor though outside the watertight portion of the case is shrouded to protect the user.
- 20-1: A single electric motor propulsion unit; 20-2; a second electric motor propulsion unit; 20-3; a third electric motor propulsion unit; 20-4; a fourth electric motor propulsion unit; 20-5; a fifth electric motor propulsion unit; whether 1, 2, 3, 4, or 5 or more electric motor propulsion units, each fixedly attaching the diver propulsion device, and each oriented along a chordal direction of the wing which is to say, along the minor axis of the wing from a leading edge to a trailing edge of the wing, and each of the electric motor propulsion units substantially parallel all the other electric motor propulsion units.
- 30: A releasable leash interconnecting the wing of the diver propulsion device and the diver; the leash may integrate control circuitry electrically connecting the electric motor propulsion units and also integrate radio-telemetric devices to control the electric motor propulsion units.
- 31: A releasable strap at the diver interface end of the leash 30.
- 33: A control knob, control device integral to the releasable strap 31, the control device electrically connecting the control circuitry within the leash so to enable the diver to manually control the motor output of the electric motor propulsion units.
- 35: A Bluetooth communication device useful to control the electric motor propulsion units.
- 37: Lead wire to an antenna, electrically connecting the antenna.
- 39: Antenna, generally mounted to a lower surface of the wing of the diver propulsion device or to a fin of the device, so to communicate with and enable control of the electric motor propulsion system of the device.
- 40: A fin, generally to stabilize the diver propulsion device during hydrofoil flight; 40-1: a single stabilizing fin; 40-2: a second stabilizing fin. Typically, the fin or fins attach the wing fixedly whether the fin or fins are rigid or non-rigid fins. The fin or fins are mounted the wing parallel a chordal direction of the wing and so stabilize the wing laterally the wing-span.
- 50: A foot constraining device attached the deck of the wing so to provide foot and feet traction of the diver to the wing-deck of the diver propulsion device. The foot constraining device may be surf wax, self-adhesive tread decking, a surfboard traction pad, a strap, and so-on.
- 60: A solar collection array; 60-1 a first solar collector; 60-2 a second solar collector. Solar arrays if of sufficient size, for example 1-meter squared area (very roughly 1600 inches square area) may collect sufficient solar energy during noon-hours to power a motor or motors of the DPD at up to about 0.40 horsepower.
- 70: Thin film solar collector of perovskite-base material construction.

Waterman, watermen: Any person, man or woman who ventures into the sea on a regular and practiced basis. Someone having expertise in the water.

Whale-tail: A wing shape of this diver propulsion device having some resemblance to the tail of a whale.

Wing: A hydrofoil lifting device bearing resemblance to a conventional aircraft wing; it may be rigid, semi-rigid, and may be inflatable; in all cases the wing has at least a positive buoyancy in water.

Span: The broadest dimension of a wing, generally referred as wing-span and is from a wing-tip to an opposite wing-tip, and is transverse a chord dimension of the wing.

Chord: For a wing, the distance from a leading edge of the wing to an opposing trailing edge of the wing, and transverse the wingspan of the wing.

Wing thickness: The measure of a wing from a top surface of the wing to an opposing bottom surface of the wing.

NACA: National Advisory Committee on Aeronautics. Generally a designator for wing section designs, the wing section designs corresponding to linear and curvelinear definition from a leading edge of the wing to a trailing edge of the wing, and defining a bottom surface of the wing and the opposing top surface of the wing, and from leading edge to trailing edge.

Screw, screws: Attachment fasteners depicted in the disclosure as an encircled SC, as in: SC.

Subsea: Below the surface of the sea.

Solar array: Solar collectors; solar panels.

Anthropometry: Human measures. These can be feet and inches, pound weight, and for the surfboard shaper or the wing fabricator may be such units as head-height, shoulder width, hip width, arms-length, under-arm length, and body weight in pounds.

DPD: Diver propulsion device: Any watercraft that may be used for diver transport but not limited to a selection from the following list: surfboards, hydrofoils, hydrofoil-surfboards, skim-boards, swim-boards, boogie-boards, diver fins, diver tugs, diver sleds, mini-subs, mini-submersibles, rescue-surfboards, and man-overboard rescue devices.

Hook-and-loop closure: releasable strap device comprised of two surfaces that close upon each other to releasably fasten the strap; on one side of the strap are hooks, and on the other side of the strap are loops.

BRIEF DESCRIPTION OF THE DRAWING FIGURES

The diver propulsion devices of this disclosure should in no way be thought to consist solely of the elements, apparatuses, devices, and methods depicted and described herein, but, that indeed, the invention is unlimited in the many and varied derivations which will naturally occur to one of normal skill in the art and having familiarity with these many teachings. Indeed, the claims and the spirit of the claims best serve to inform and define the boundaries of innovation, the legally protected aspects of this invention. Following are brief descriptions of the invention figures, drawings, and schematics which should not be considered limiting, but rather instructional and illuminating of this invention.

FIG. 1A: Perspective view of DPD 100, looking down and forward, the diver atop the wing deck.

FIG. 1B: Side view of DPD 100, the diver atop the wing deck.

Figure 1C:
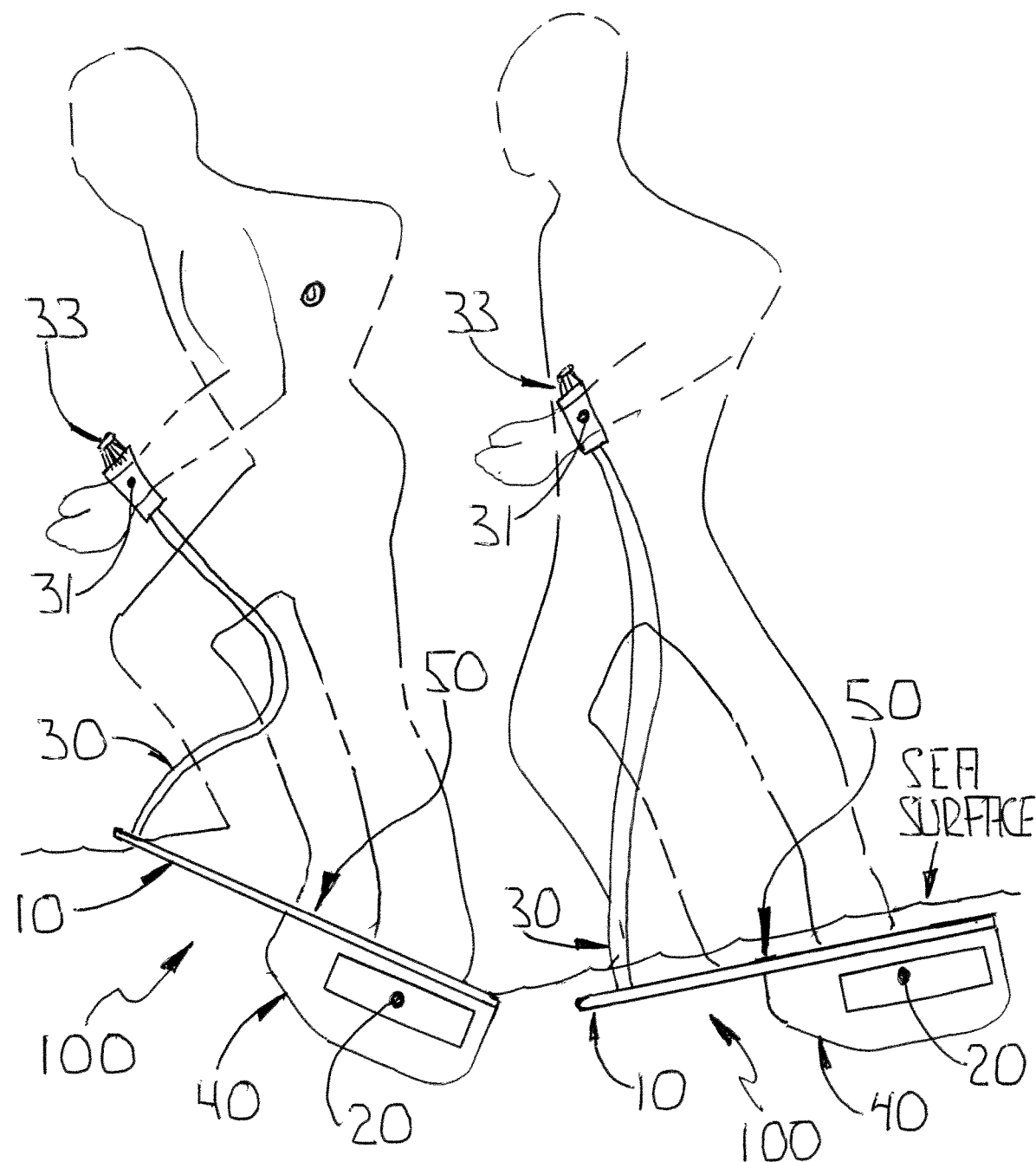

FIG. 1C: Side view of DPD 100, the diver atop the wing deck and propelling the DPD via heave-and-pitch of the device.

Figure 2A:
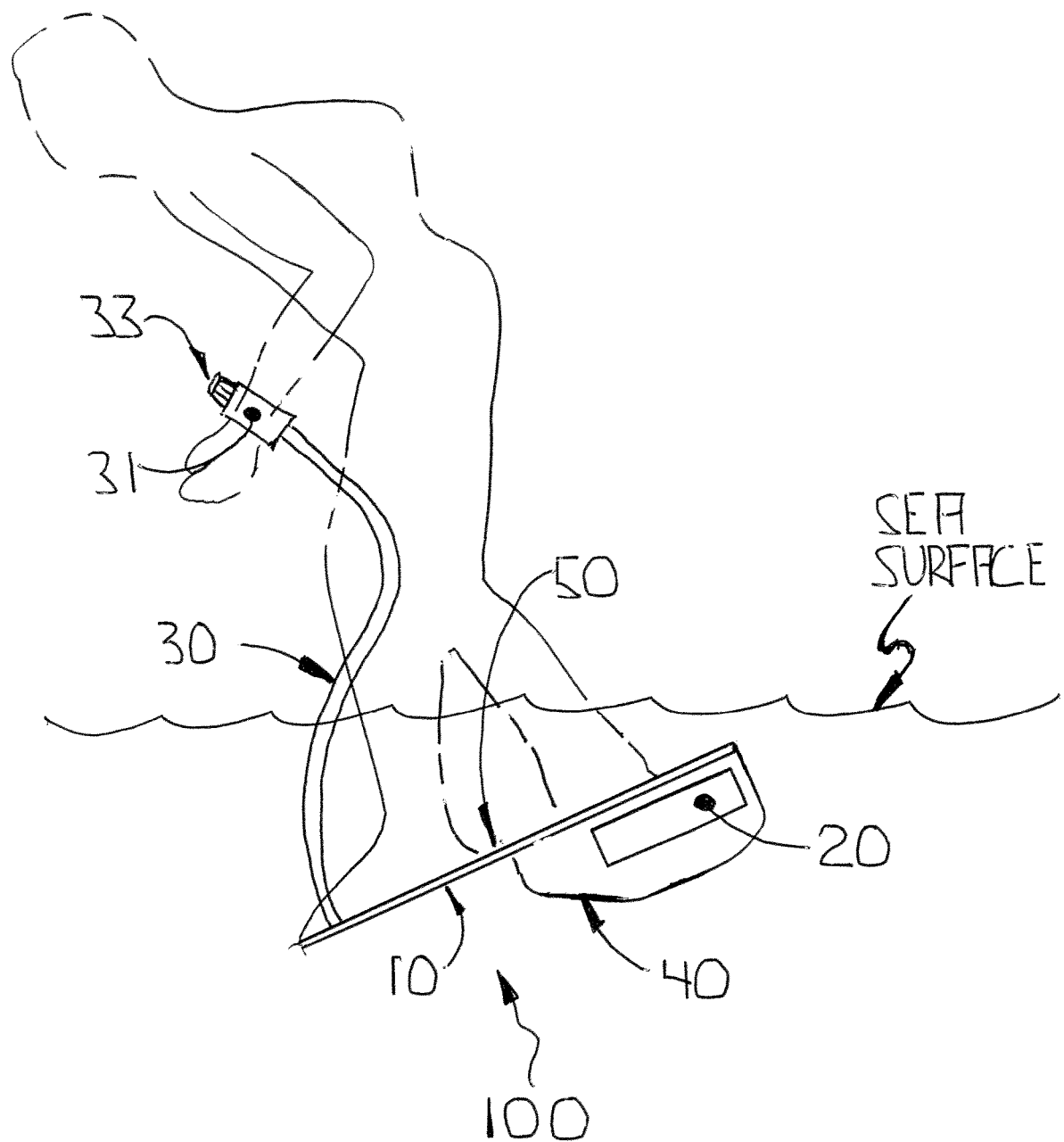

FIG. 2A: Side view of DPD 100, the diver atop the wing deck and pitching the leading edge of the wing down into the sea and preparing to dive under the sea surface.

Figure 2B:
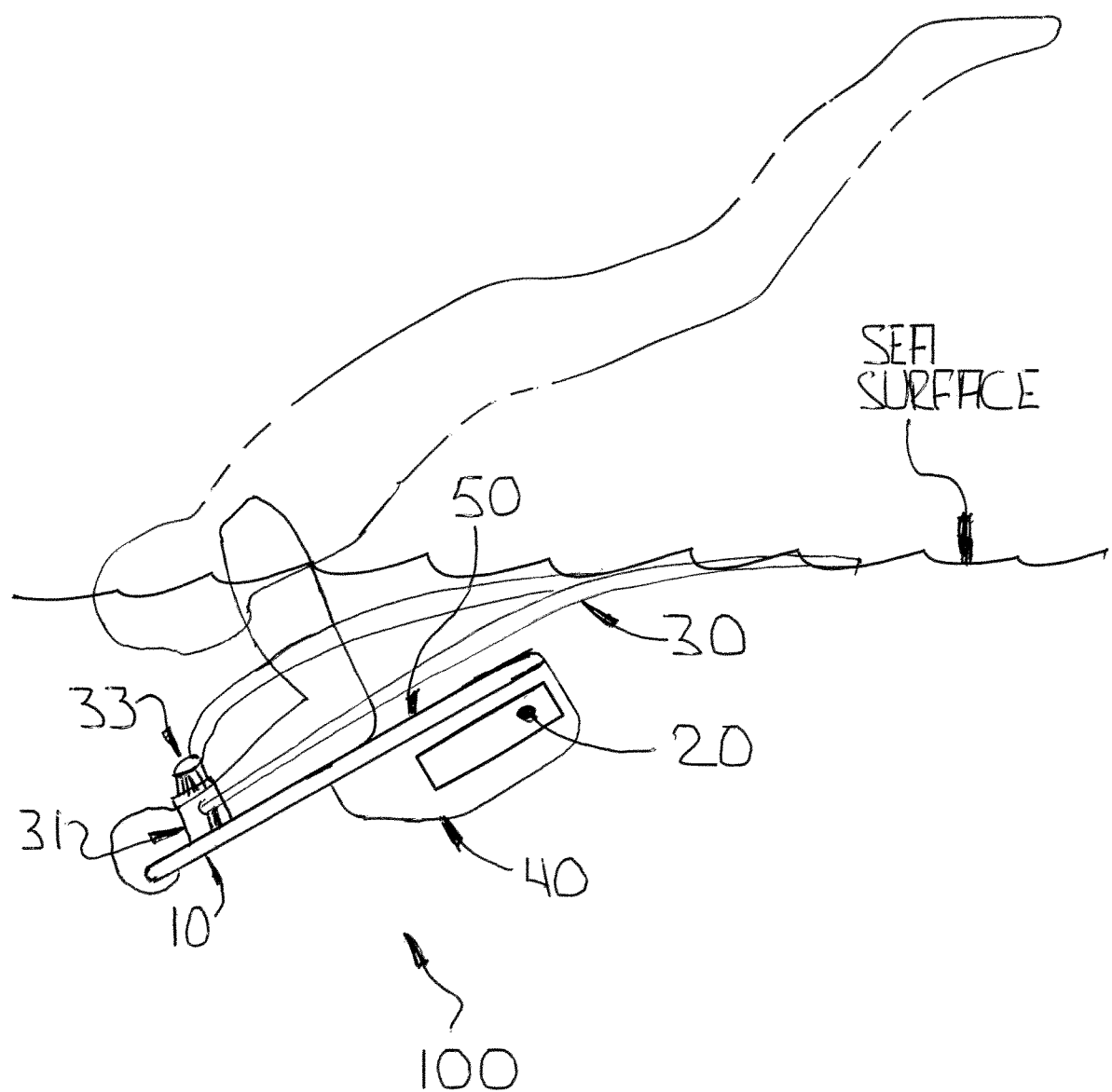

FIG. 2B: Side view of DPD 100, the diver atop the wing deck and stretching out preparing to lie upon the deck of the wing and using hand pressure to maintain proper diving pitch to dive under the surface of the sea.

Figure 2C:
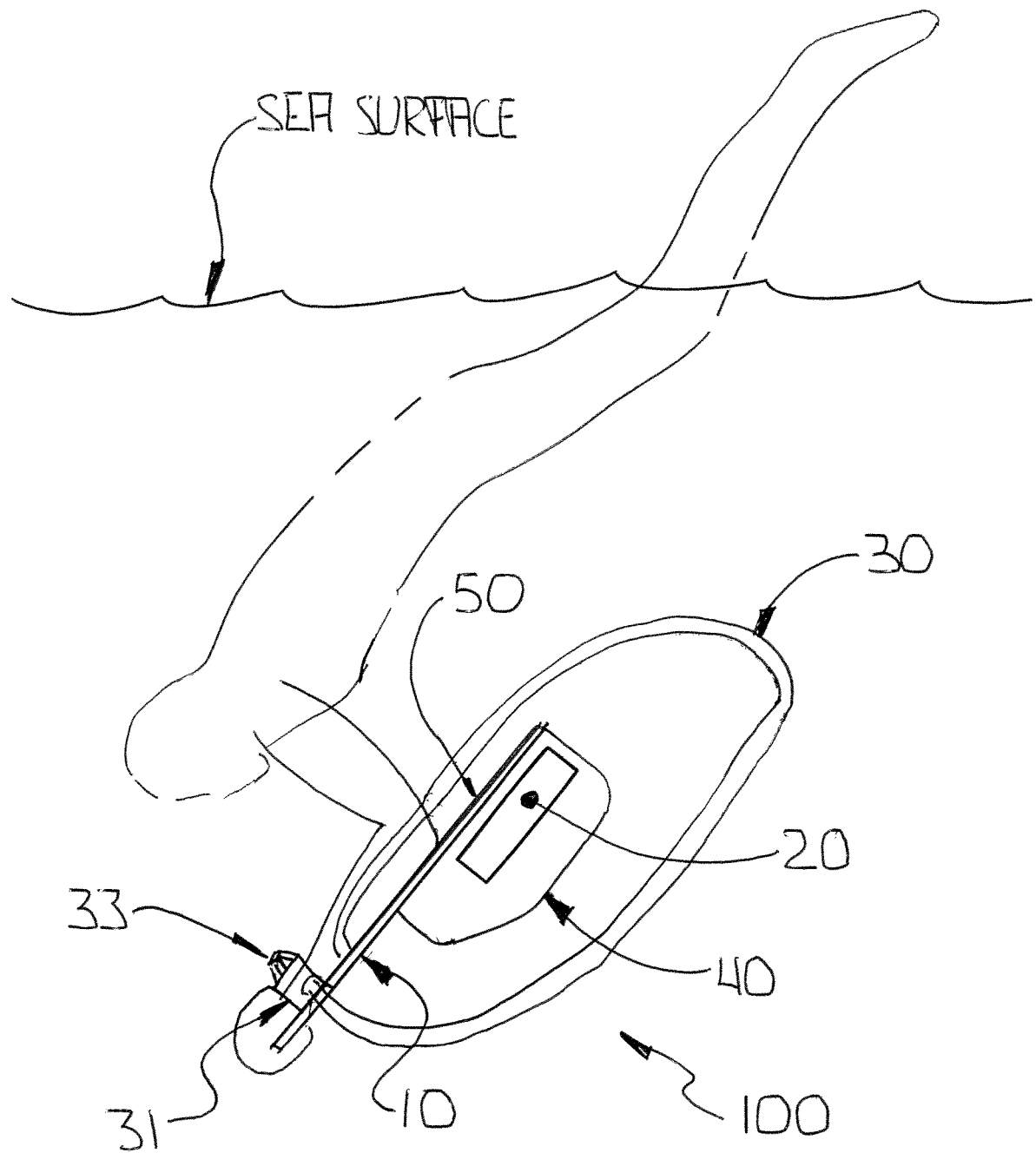

FIG. 2C: Side view of DPD 100, the diver lying upon the wing deck and diving below the surface of the sea.

Figure 2D:
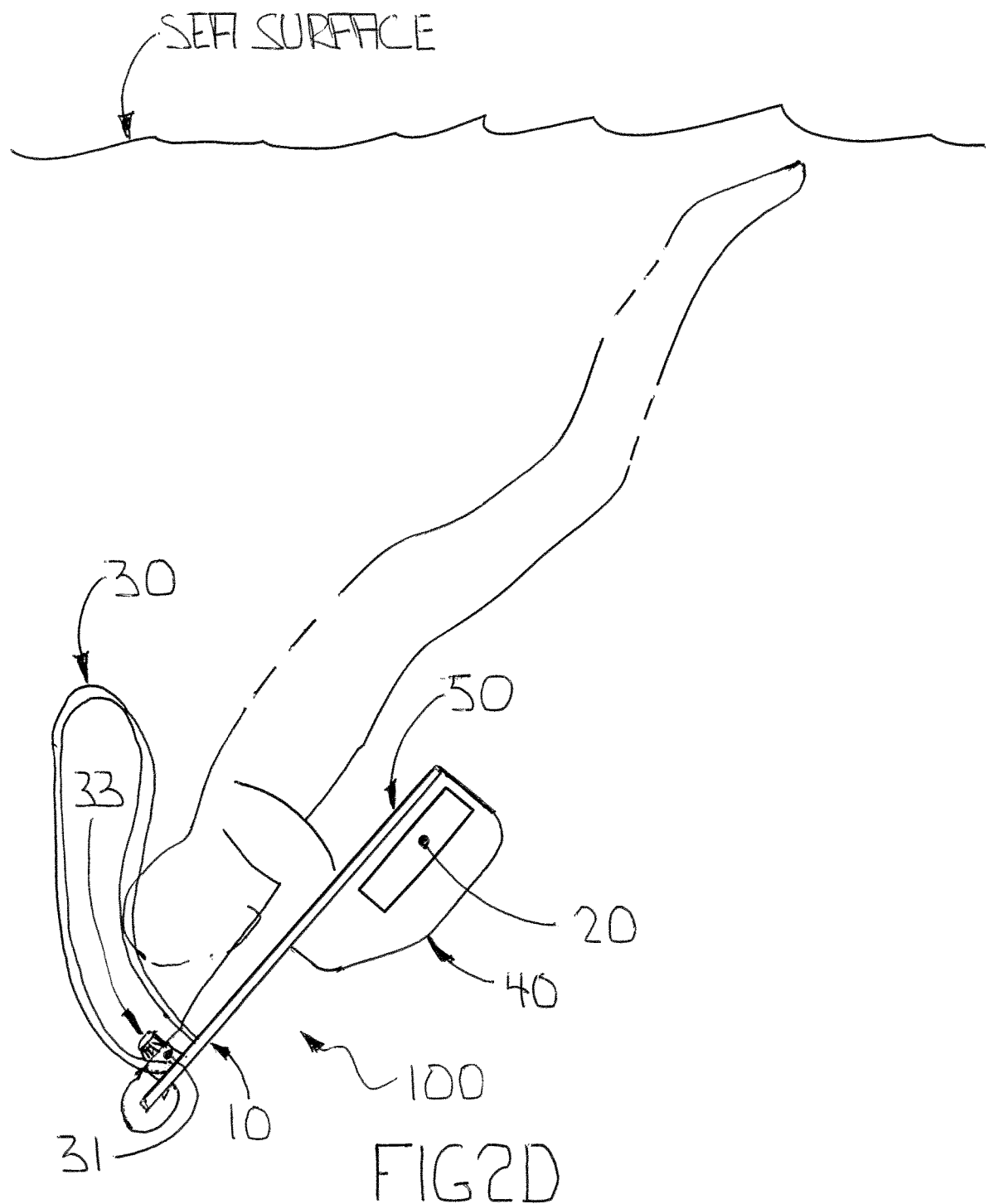

FIG. 2D: Side view of DPD 100, the diver lying upon the wing deck and continuing to dive beneath the surface of the sea.

Figure 2E:
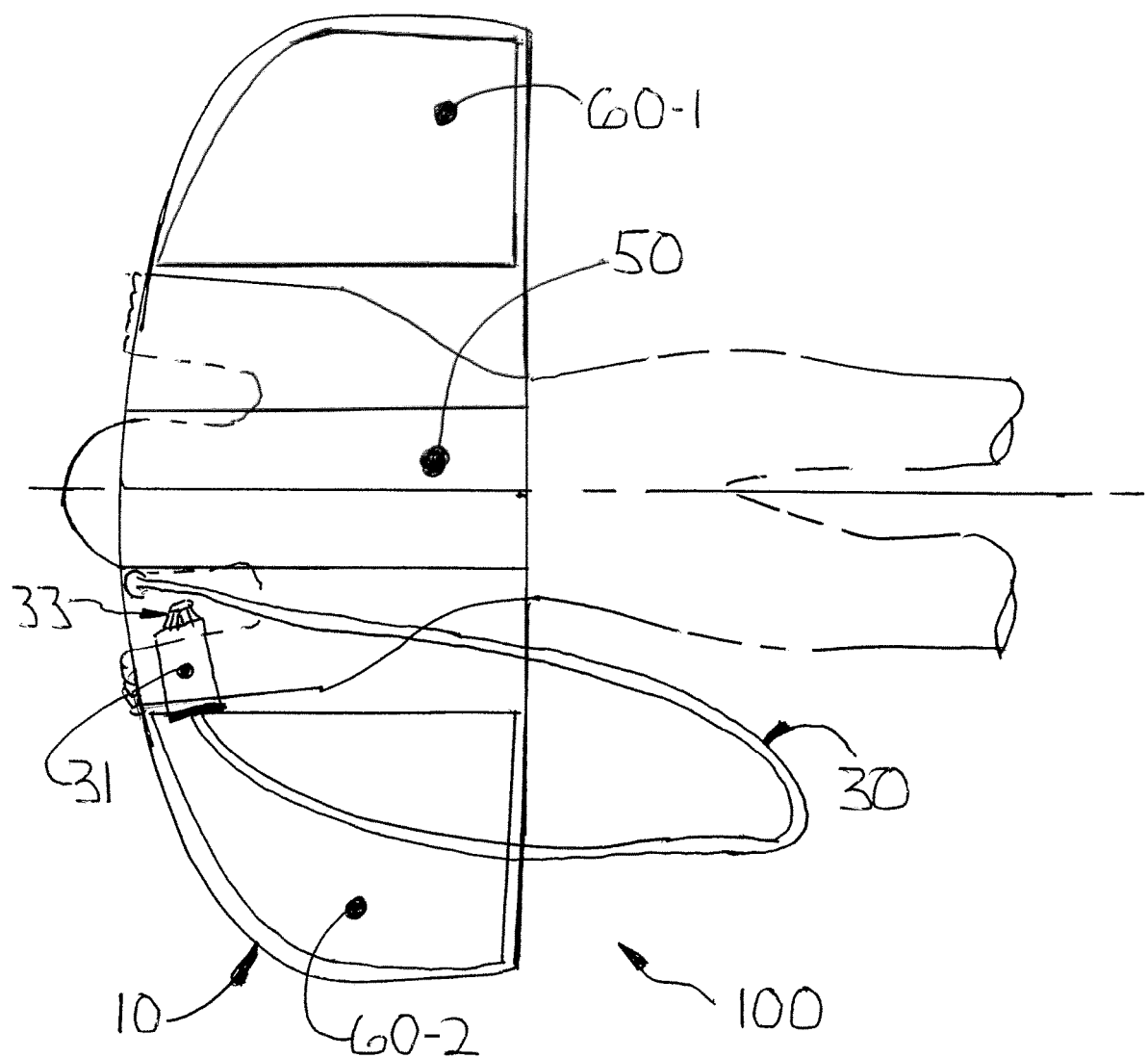

FIG. 2E: Top view looking down upon DPD 100, the diver lying upon the wing deck, and in position to be towed by the device whether upon the sea surface or beneath the surface of the sea.

Figure 2F:
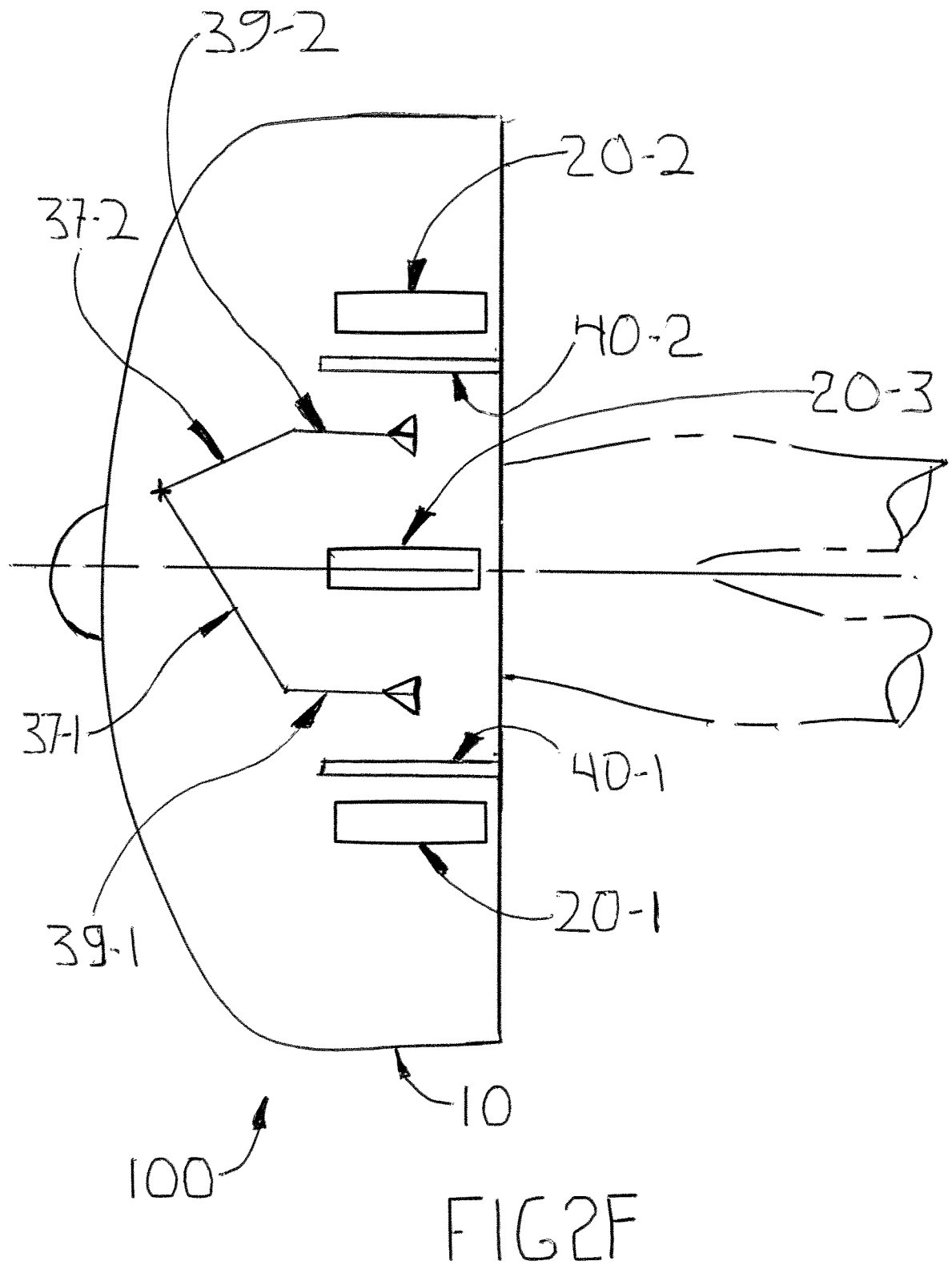

FIG. 2F: Bottom view looking up upon DPD 100, the diver lying upon the wing deck, and in position to be towed by the device whether upon the surface of the sea or beneath the surface of the sea.

Figure 3A:
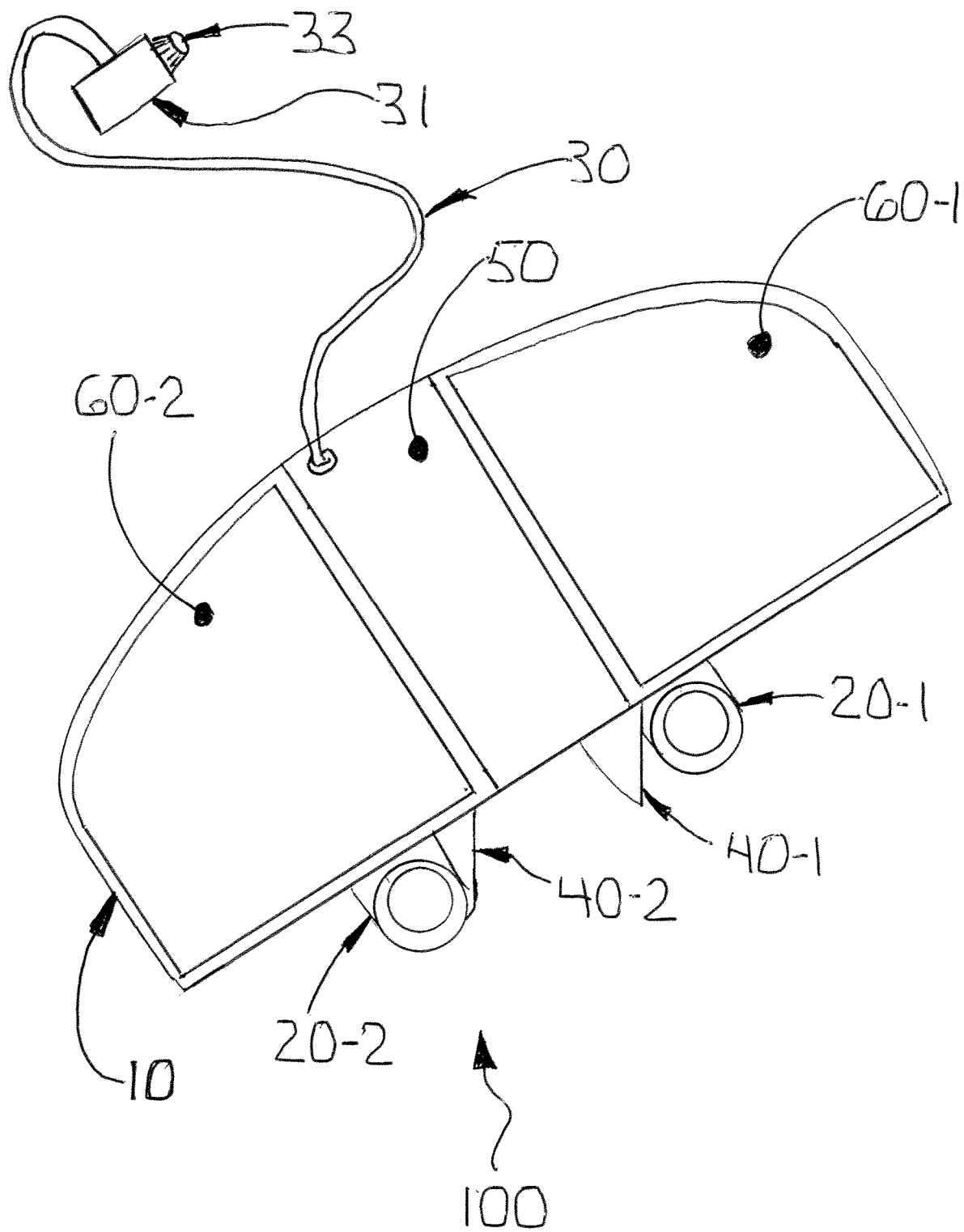

FIG. 3A: Perspective view of DPD 100 looking down and forward.

Figure 3B:
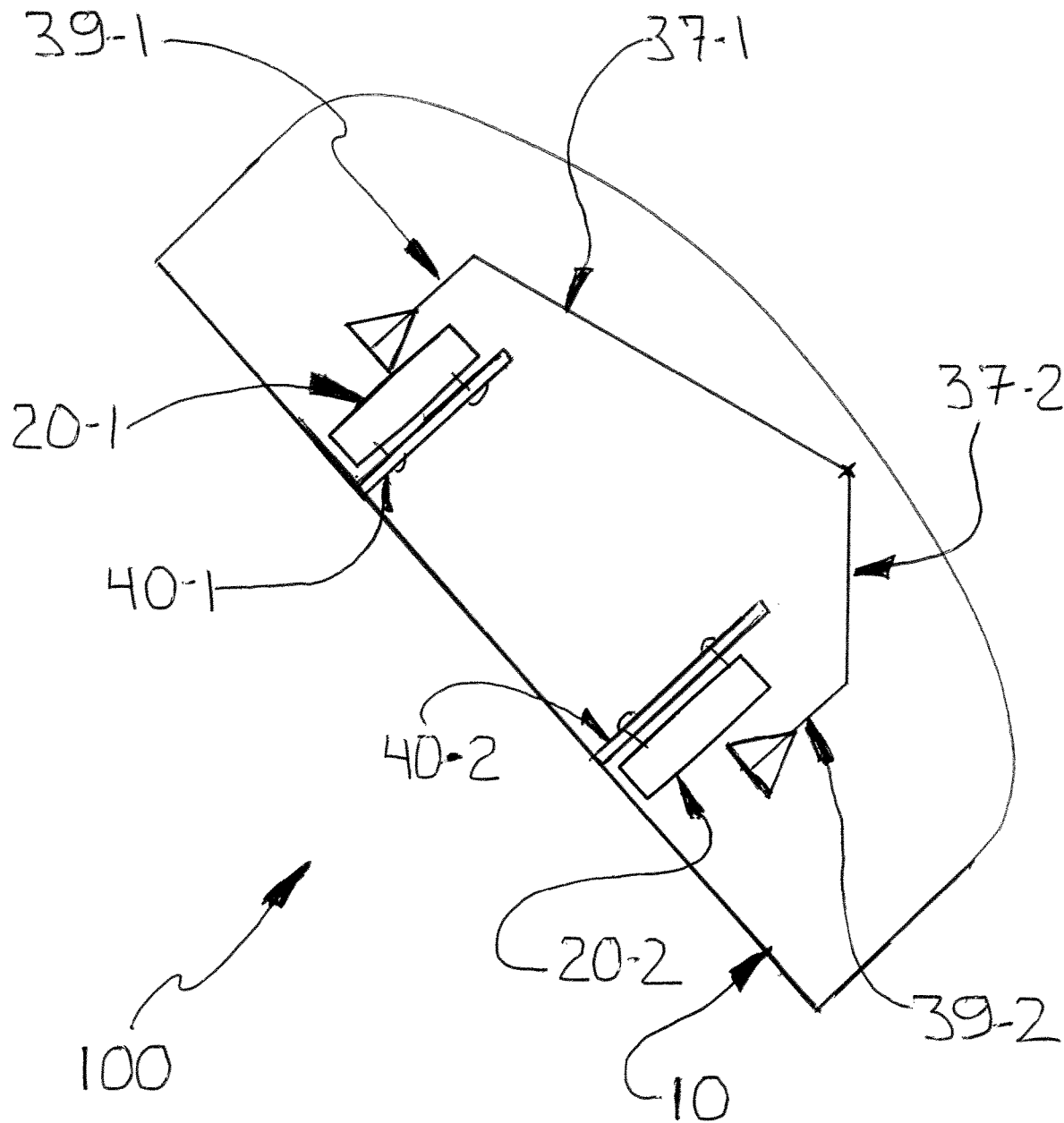

FIG. 3B: Perspective view of DPD 100 looking up and forward.

FIG. 3C: Top view looking down on DPD 100.

FIG. 3D: Rear view looking forward on DPD 100.

Figure 4A:
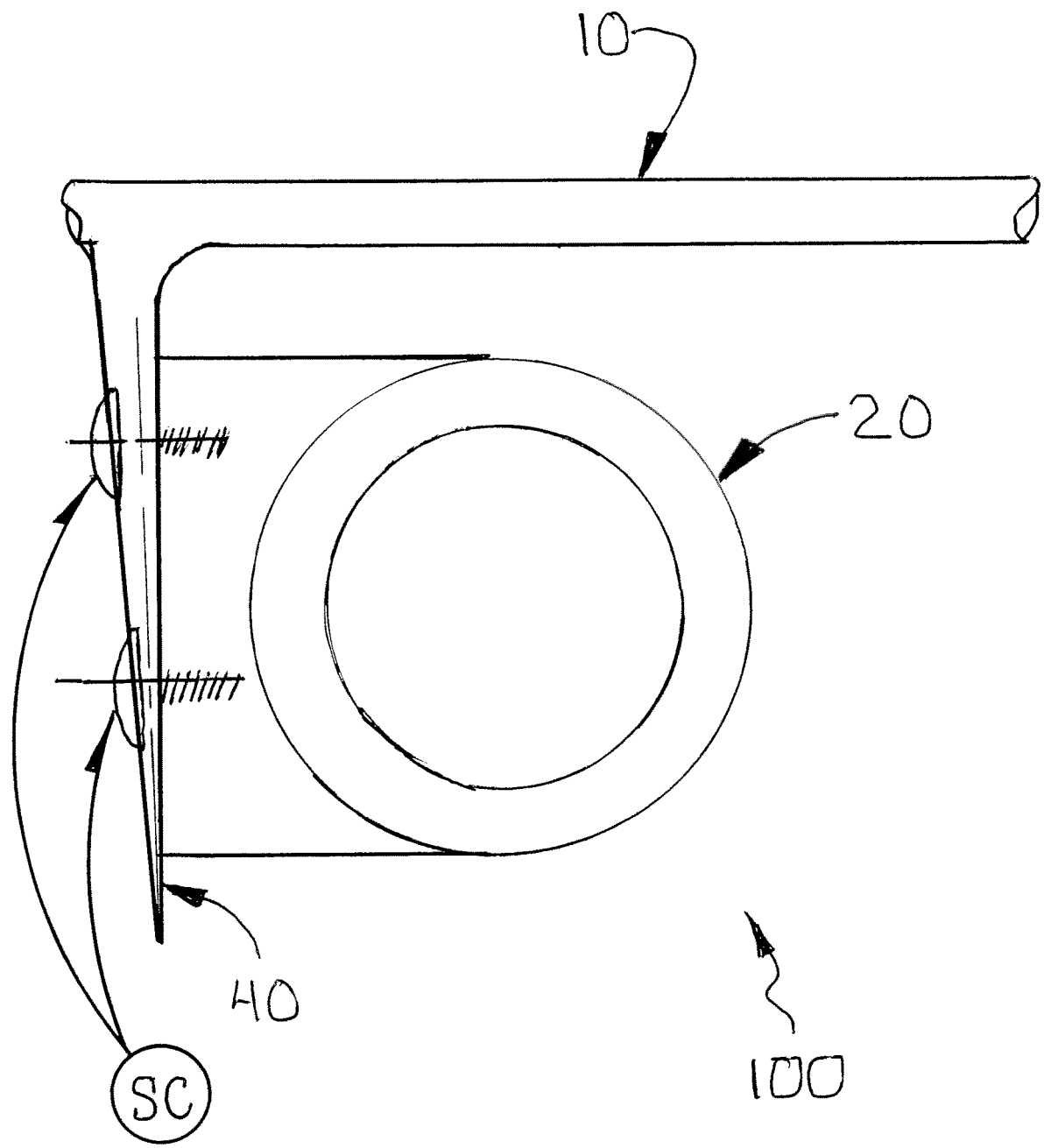

FIG. 4A: Detail view of DPD 100 illustrating the attachment of the motor 20 onto the fin 40, and the fin 40 onto the wing 10; screws common to the fin and motor are removable.

Figure 5A:
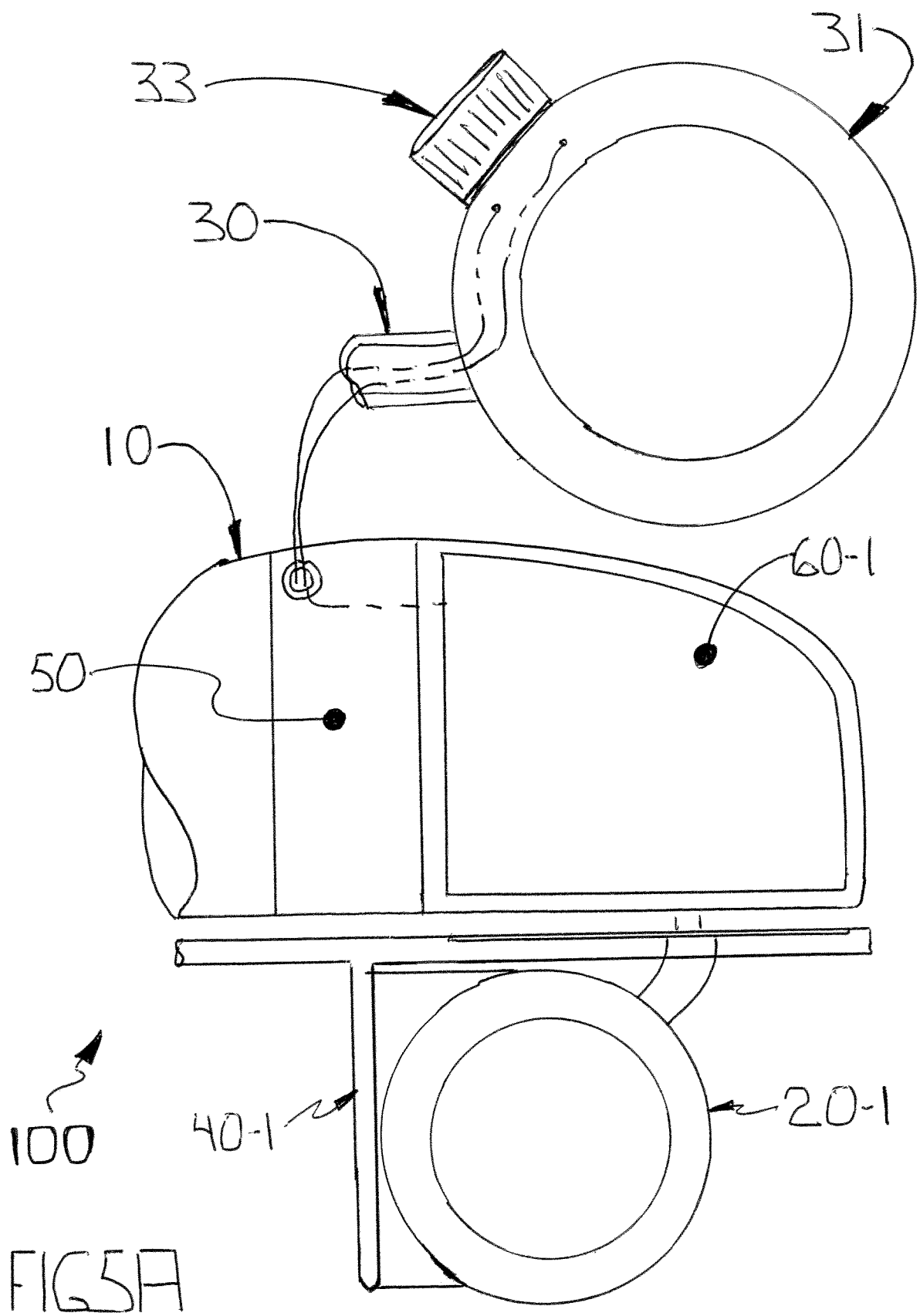

FIG. 5A: Exploded schematic view of DPD 100, showing the electric connectivity of solar array 60-1 and the electric motor propulsion unit 20.

Figure 5B:
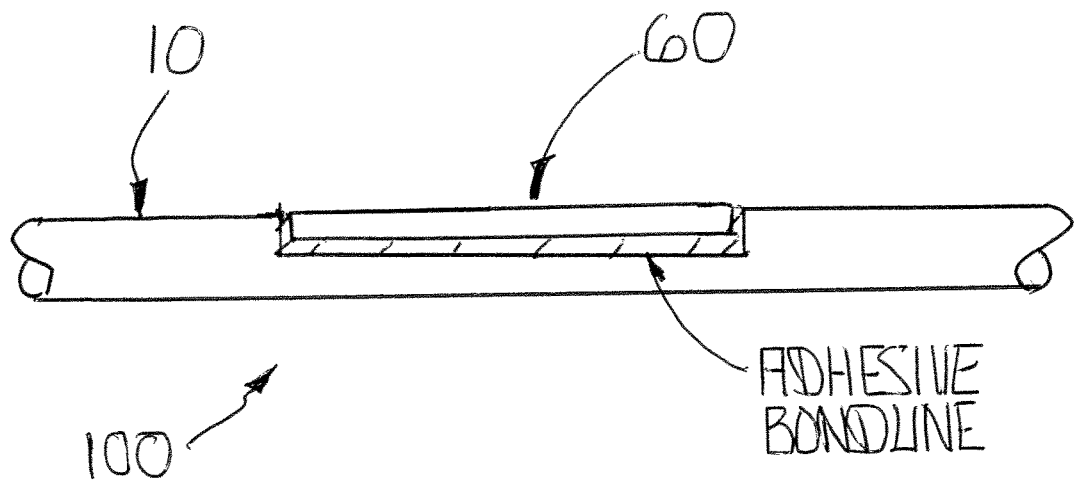

FIG. 5B: Detail section cut view of DPD 100 showing wing 10 and wing 10 recess, the recess receiving solar array 60 which is adhesively bonded into the recess.

Figure 5C:
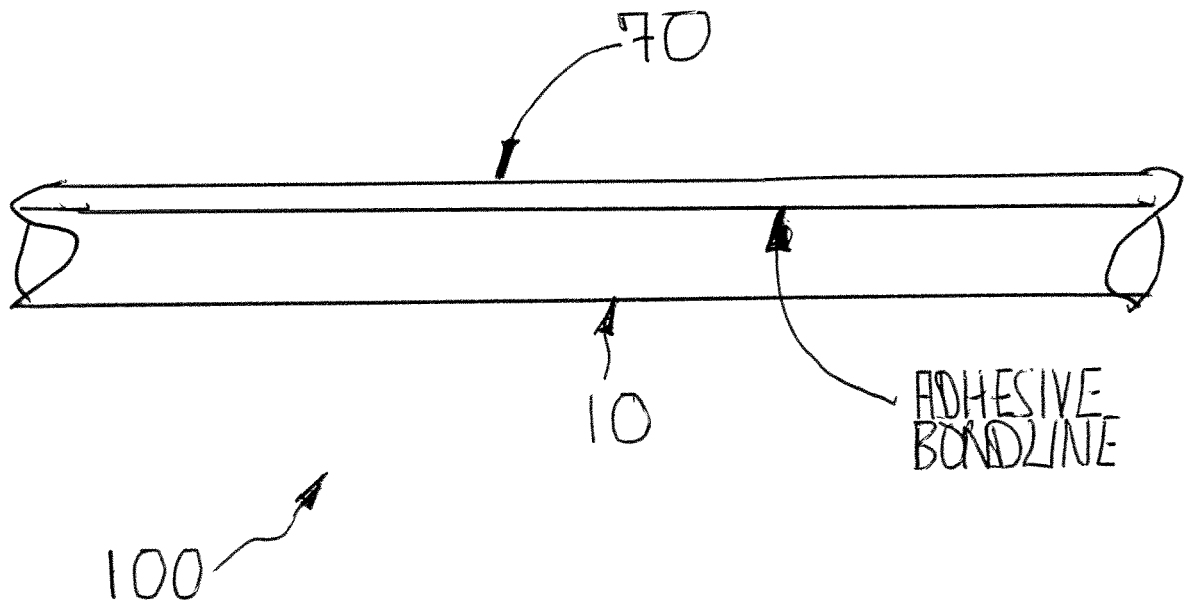

FIG. 5C: Detail section cut view DPD 100 showing wing 10 and thin film solar array 70, thin film solar array adhesively bonded to the top of wing 10.

Figure 5D:
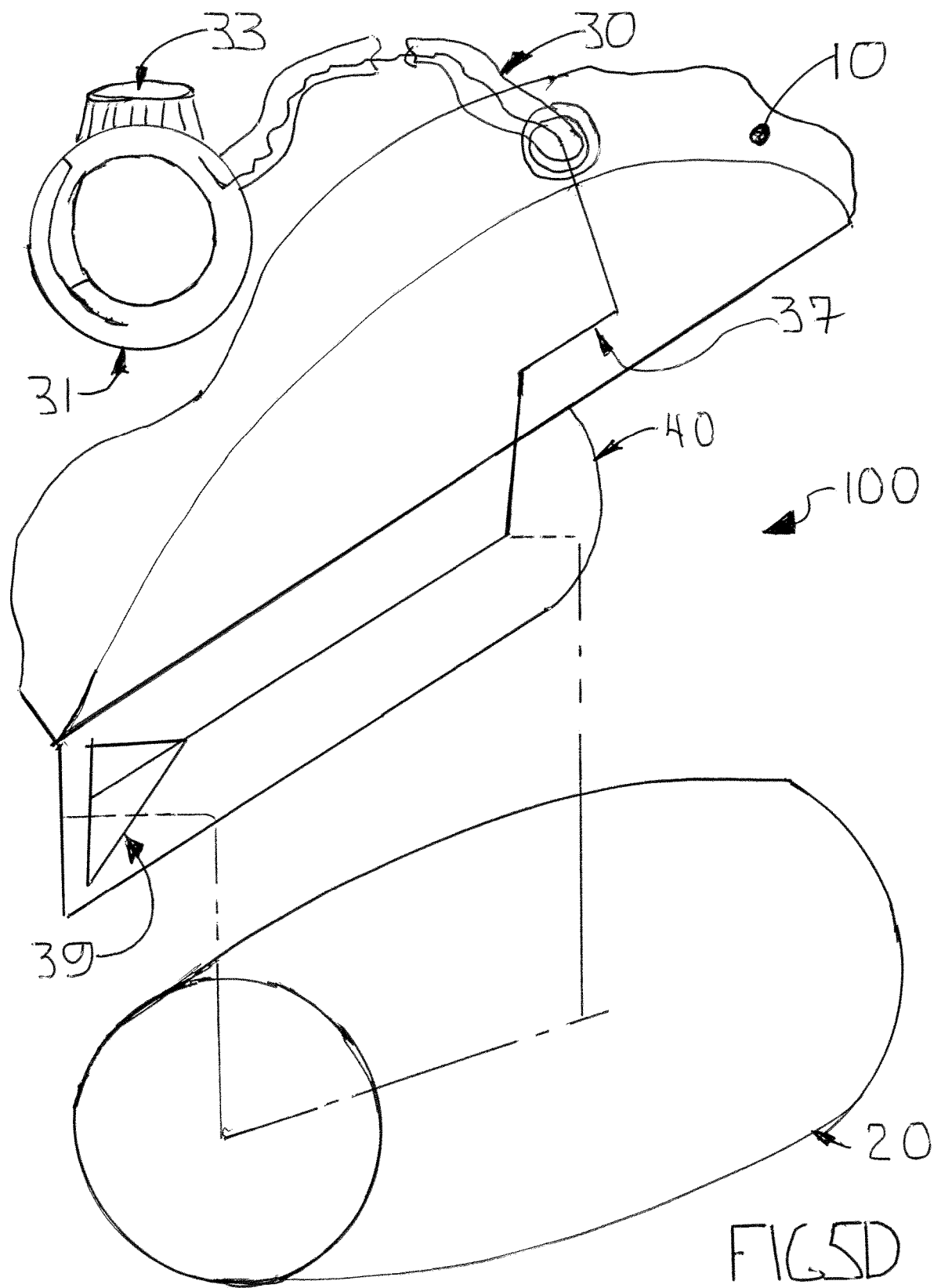

FIG. 5D: Exploded isometric schematic view of DPD 100 showing antenna 39 mounted fin 40 and in closest possible proximity to electric motor propulsion unit 20. The closest proximity of antennae to the motors ensures the best radio reception and thereby positive control of the motors. Water is notoriously disruptive of radio signals and so the closer the antenna to the receiver, the better the reception and the better the control of the propulsors.

Figure 6A:
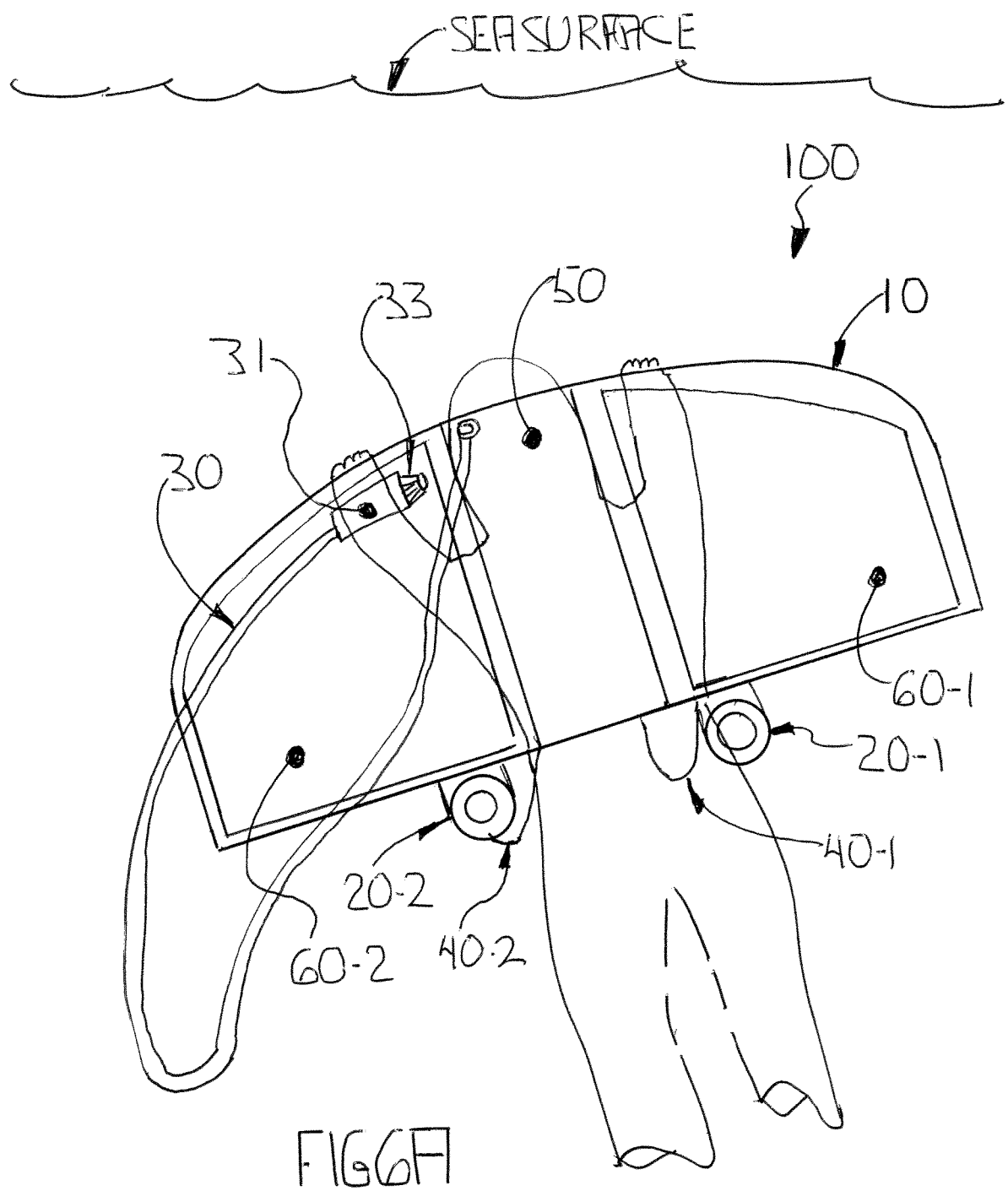

FIG. 6A: Perspective view looking down and forward upon DPD 100, the diver lying upon the wing deck and operating beneath the surface of the sea.

Figure 7A:
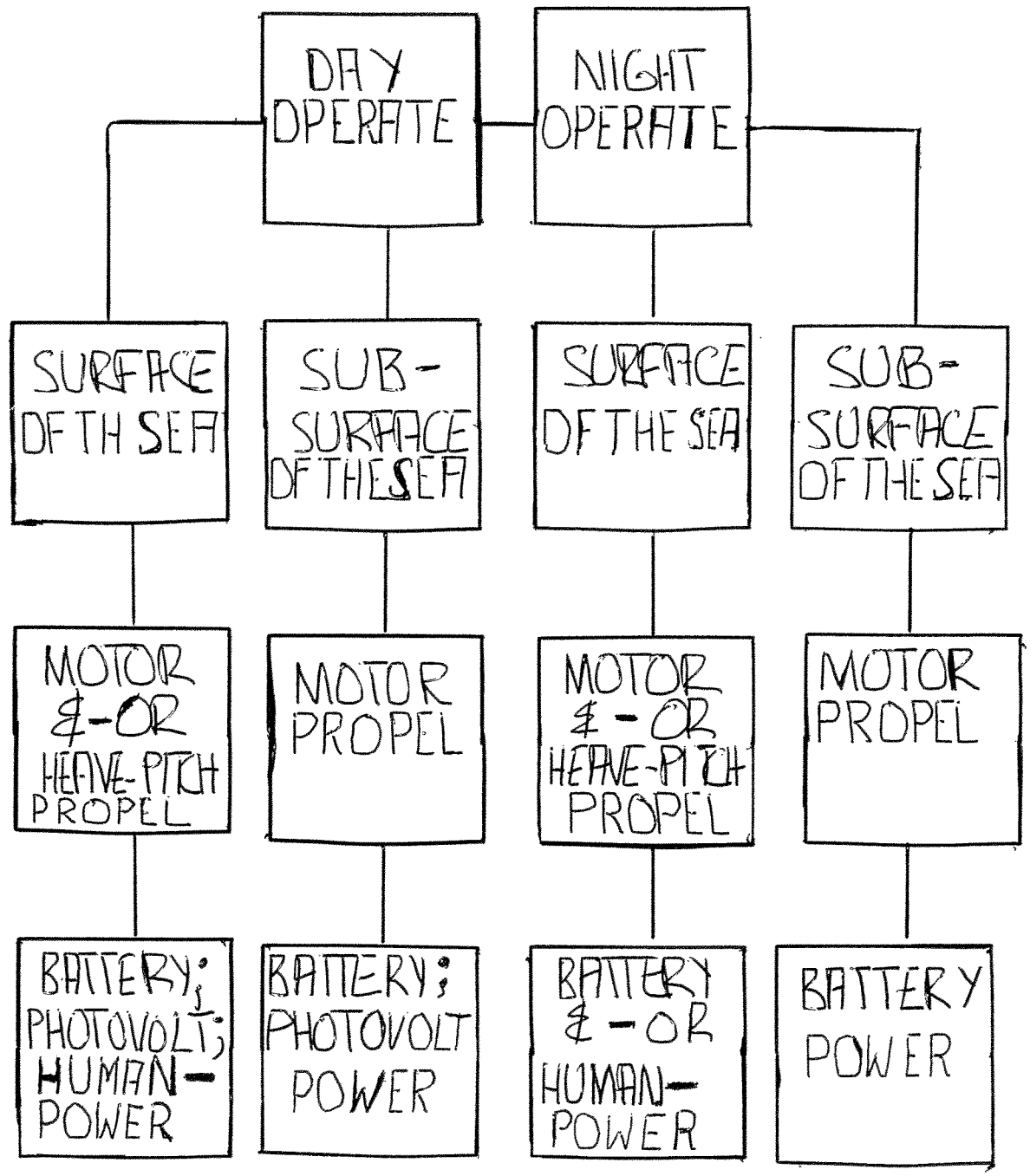

FIG. 7A: View of flow chart of available operations in day or night; sea surface or sub-sea surface operation; propulsion methods of motor propulsion and heave-and-pitch propulsion; power sourcing of battery, photovoltaic, and human power.

Figure 8A:
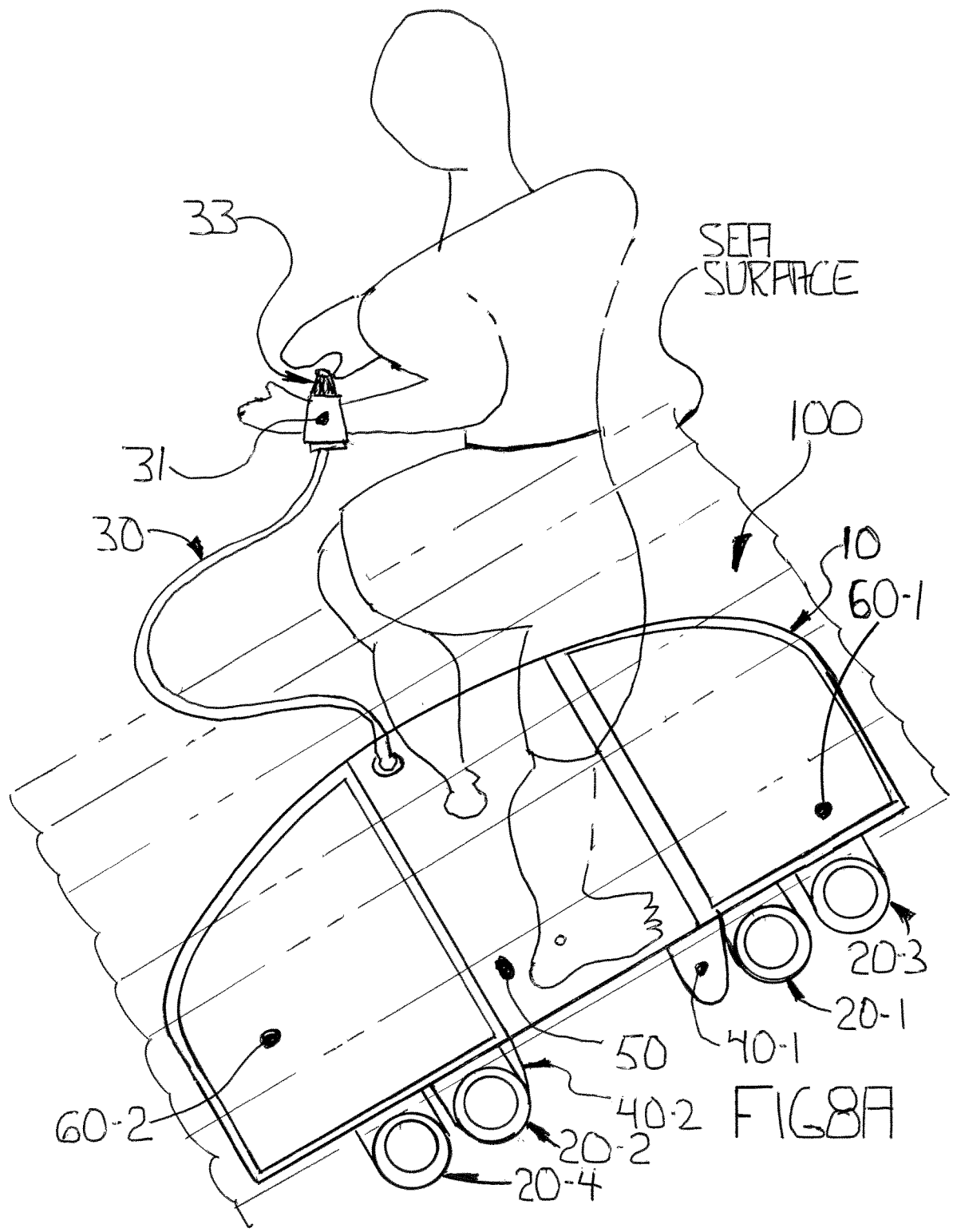

FIG. 8A: Perspective view looking down and forward upon DPD 100, at the surface of the sea, the diver standing upon wing deck foot constraint 50, propulsion motors 20-1, 20-2, 20-3, and 20-4 under wing 10, leash 30, strap 31, control knob 33, fins 40-1 and 40-2 under wing 10, and solar energy collecting arrays 60-1 and 60-2 atop wing 10.

Now follows detail descriptions of the drawing figures.

DETAIL DESCRIPTION OF THE DRAWING FIGURES

The following descriptions explain the noted drawing figures in detail.

Turning first to FIG. 1A, DPD 100 is shown comprised as wing 10, electric motor propulsion units 20-1 and 20-2, leash 30, releasable strap 31, control knob 33, stabilizing fins 40-1 and 40-2, frictional foot constraint 50, solar collector arrays 60-1 and 60-2, the diver standing atop the wing deck and operating the device at and slightly below the sea surface.

Turning now to FIG. 1B, in this side view DPD 100, is shown comprised as wing 10, electric motor propulsor unit 20, leash 30, releasable strap 31, control knob 33, stabilizing fin 40 and deck frictional foot constraint 50, the diver upon the deck of the wing and at the sea surface.

Turning now to FIG. 1C, in this side view of DPD 100 the device is shown as wing 10, electric motor propulsion unit 20, leash 30, releasable strap 31, control knob 33, stabilizing fin 40 and foot constraining frictional device 50, the diver atop the wing 10 and heaving and pitching the device to propel forward thru the sea; the diver first down-pitching then up-pitching the device.

Turning now to FIG. 2A, in this side view of DPD 100, the device is shown comprised of wing 10, propulsor 20, leash 30, releasable strap 31, control knob 33, stabilizing fin 40, frictional foot constraint 50 atop the deck of the wing 10; the diver pitching down and preparing to dive beneath the surface of the sea.

Turning now to FIG. 2B, in this side view of DPD 100, the device is shown comprised of wing 10, electric motor propulsion unit 20, leash 30, releasable strap 31, control knob 33, stabilizing fin 40, and frictional foot constraining device 50, the diver stretching outward and placing hand pressure upon the leading edge of the wing 10 so to enter into a dive beneath the surface of the sea.

Turning now to FIG. 2C, the side view shows DPD 100 comprised of wing 10, propulsion motor 20, leash 30, releasable strap 31, control knob 33, stabilizing fin 40, frictional foot constraining device 50 atop the wing and the diver atop the deck of the wing and proceeding to dive down beneath the surface of the sea.

Turning now to FIG. 2D, the side view shows DPD 100 comprised of wing 10, propulsion motor 20, leash 30, releasable strap 31, control knob 33, stabilizing fin 40, and frictional foot constraining device 50, the diver atop the wing 10 and diving below the surface of the sea.

Turning now to FIG. 2E, the top view looking down upon DPD 100 shows it comprised as wing 10, the propulsion motors are obscured by the wing 10, leash 30, releasable strap 31, control knob 33, frictional foot constraining device 50 atop the wing, solar collector arrays 60-1 and 60-2 atop the wing, the diver lying atop the deck of the wing.

Turning now to FIG. 2F, the bottom view looking up upon the DPD 100 shows it comprised as wing 10, propulsion motors 20-1, 20-2, 20-3, leash 30 et-al obscured by the wing 10, stabilizing fins 40-1 and 40-2, antenna lead wires 37-1 and 37-2, and antennae 39-1 and 39-2, in close proximity to the propulsion motors 20-1, 20-2, 20-3, the diver lying upon the deck of wing 10.

Turning now to FIG. 3A, the perspective view looking forward and down upon DPD 100, the DPD is shown comprised as wing 10, electric propulsion motors 20-1, 20-2, leash 30, releasable strap 31, control knob 33, stabilizing fins 40-1 and 40-2, wing-deck frictional foot-constraining device 50, solar-collector arrays 60-1 and 60-2.

Turning now to FIG. 3B, the perspective view looking up and forward upon DPD 100, the device is shown to be comprised of wing 10, propulsion motors 20-1 and 20-2, leash 30 and its components obscured by wing 10, stabilizing fins 40-1 and 40-2, antenna lead wires 37-1 and 37-2, and antennae 39-1 and 39-2, in close proximity to the propulsion motors 20-1 and 20-2. Screws attaching thru the fins 40-1 and 40-2 fixedly attach the motors 20-1 and 20-2 and are removable.

Turning now to FIG. 3C, the top view looking down upon DPD 100 shows it to be comprised of wing 10, propulsion motors 20-1, 20-2, are obscured by wing 10, leash 30, releasable strap 31, and control-knob 33, frictional foot constraining device 50 atop the top surface of wing 10, and solar collector arrays 60-1 and 60-2 atop the wing 10.

Turning now to FIG. 3D, the view looking forward at the rear of DPD 100, the device is shown to be comprised as wing 10, motor propulsors 20-1 and 20-2, leash 30, releasable strap 31, control knob 33, stabilizing fins 40-1 and 40-2, foot tractional device 50 atop the wing at a center of wing-span portion of the wing 10, solar collector arrays 60-1 and 60-2 atop wing 10 at outboard portions of wing 10, and screws common to fins 40-1 and 40-2 and propulsion motors 20-1 and 20-2.

Turning now to FIG. 4A, the detail view shows DPD 100 comprised as wing 10, propulsion motor 20, stabilizing fin 40 and attachment screws common between the motor 20 and the fin 40.

Turning now to FIG. 5A, the exploded schematic view of DPD 100 shows the electric connectivity of the components of the DPD as wing 10 with attaching solar collector array 60-1, insulated wires from solar array 60-1 thru leash 30 thru releasable strap 31, and to control knob 33, and the insulated electric-wire further connecting to electric motor propulsor 20, fin 40, and foot tractional device 50.

Turning now to FIG. 5B, showing attachment of solar collector array 60 recessed and bonded adhesively into recess of wing 10 to comprise DPD 100.

Turning now to FIG. 5C, showing attachment of solar collector array 70 onto the top surface of wing 10, and the adhesive bond-line attaching the solar collector array 70 to the wing 10 to comprise DPD 100.

Turning now to FIG. 5D, the exploded schematic view of DPD 100 shows the electric and radio connectivity of the motor 20 and antenna 39 residing upon stabilizing fin 40, and antenna lead wire connecting antenna 39 and to control knob 33 of leash 30.

Turning now to FIG. 6A, the perspective view looking down upon and forward with respect to DPD 100 shows the device to be comprised of wing 10, propulsion motors 20-1 and 20-2, leash 30, releasable strap 31, control know 33, stabilizing fins 40-1 and 40-2, frictional foot constraining device 50 upon top of wing 10 proximate a center-of-wing-span portion of wing 10, and solar collector arrays 60-1 and 60-2 atop the wing and outboard of the wing 10 center-of-span portion, the diver operating the diver propulsion device below the sea surface.

Turning now to FIG. 7A, the flow chart shows operational choices available the user of the device of this disclosure as: day and night operations, surface day operations, sub-sea day operations, surface night operations, sub-sea night operations, motor propelling or and heave and pitch propulsion during day surface operations, motor propulsion during day sub-sea operation, motor and or heave and pitch propulsion during night surface operation, motor propulsion during night sub-sea operation, battery and or photovoltaic and or human powered powering during surface day operations, battery and or photovoltaic powering of the motors during day sub-sea operation, battery and or human power during night surface operations, and finally battery powering of the motors during night sub-sea operation.

Turning lastly to FIG. 8A, the perspective view looking down and forward shows the DPD 100 comprised as wing 10, propulsion motors 20-1, 20-2, 20-3, and 20-4, leash 30, releasable strap 31, control knob 33, stabilizing fins 40-1 and 40-2, wing deck foot tractional constraint device 50 underfoot the diver and atop the wing 10, solar energy collector arrays 60-1 and 60-2, the diver operating DPD 100 just under the sea surface and hand-adjusting the power outputs of the propulsion motors 20-1, 20-2, 20-3, and 20-4, the diver being substantially above the sea surface with only the diver's lower leg portions wetted by the sea.

Conclusion, Ramifications and Scope of the Invention

The Diver Propulsion Device (DPD) of this invention disclosure combines in one device both hydrofoil-flying of a diver at the sea-surface and towing of the diver below the sea-surface. The DPD is most simply embodied as a wing buoyant in water and an electric motor propulsion unit attaching the wing. The wing is in span-wise dimension roughly equal to the head-height of the diver but may be substantially greater and also may be substantially less than head height the diver, and the wing is in chordal dimension roughly equal the shoulder-width of the diver but again, may be much more or less than shoulder width the diver, and wing thicknesses vary from as little as a fine feather edge at the trailing edge of the wing, to as much as 9 inches thick and more, especially at the wing deck, where the diver stands. The wing may be flat both atop the wing and on the bottom surface of the wing. The wing may also be convex on the wing top surface as opposed to flat, and again with the bottom surface of the wing flat. The electric motor propulsor, in the case where there is only one propulsor, attaches the wing mid-span the wing and is oriented chordwise, which is to say from leading edge to trailing edge, and the DPD in use propels water aft-ward to propel device and diver forward both in hydrofoil flight upon the surface of the sea, and, also when towing the diver, beneath the surface of the sea. In other preferred embodiments of the invention, the DPD is comprised of hydrofoil-wing, a plurality of electric motor propulsors, a leash interconnecting wing and diver, and the leash may integrate control circuitry of the electric motor propulsors, stabilizing fins oriented chordwise from wing leading edge toward wing trailing edge, batteries integral the electric motor propulsor cases, and solar energy collecting arrays atop the wing but outside of the diver deck. The diver may stand and may also lie upon the deck of the wing of the DPD. The diver may propel the DPD by heaving and pitching the DPD at the surface of the sea and may also use electric power via the electric motor propulsion units to hydrofoil-fly. When diving beneath the surface of the sea, the DPD tows the diver via electric motor power. Whether hydrofoil-flying the diver upon the sea, or towing the diver undersea, the electric power energizing the motors of the DPD is supplied by battery and, also by the photovoltaic solar energy collecting arrays atop the wing. Many derivatives of this invention will occur to those of some skill in the art, therefore, the following claims should be given the broadest, most expansive interpretation.

What is claimed is:

1. A diver propulsion device having a deck upon which a diver may stand and kneel and lay, the diver propulsion device comprised of:
   A) a wing buoyant in water, the wing having a wing-span, a wing-chord, and a wing-thickness, wherein the wing-span approximates a height of the diver and the wing-chord approximates a shoulder-width of the diver at a center of the wing-span, and wherein the wing is substantially flat upon an upper surface of the wing and is substantially flat upon a lower surface of the wing,
   B) at least one electric motor propulsion unit attached to the lower surface of the wing, and the at least one electric motor propulsion unit being oriented parallel a chordal direction of the wing,
   C) a leash interconnecting the wing and a wrist of the diver, and
   D) an electric motor control circuit integrated in the leash, wherein the electric motor control circuit is in electronic communication with the at least one electric motor propulsion unit and a wrist-strap mounted controller for operation by the diver, whereby the diver may control a thrust level of the at least one electric motor propulsion unit, wherein the diver propulsion device is configured for hydrofoil-flying the diver upon a sea surface by the diver heaving and pitching the diver propulsion device and by the at least one electric motor propulsion unit, and wherein the diver propulsion device is configured for diving below the sea surface and towing the diver under the sea surface by the at least one electric motor propulsion unit.

2. The diver propulsion device of claim 1 further comprised of at least two stabilizing fins attached to a bottom surface of the wing.

3. The diver propulsion device of claim 1 comprising a solar energy collector.

4. The diver propulsion device of claim 1, wherein the wrist-mounted controller comprises a control knob.

5. A method of propelling a diver propulsion device for hydrofoil-flying a diver upon the surface of a body of water and for diving below the surface of the body of water and towing the diver under the surface of the body of water, by a diver situated upon a deck of a wing of the diver propulsion device, the diver propulsion device comprising the wing, the wing having a wing-span, a wing-chord, and a wing-thickness and, wherein the wing-span approximates a height of the diver and the wing-chord approximates a shoulder-width of the diver at a center of the wing-span, at least one electric motor propulsor, a leash interconnecting the diver and the diver propulsion device, and an electronic control circuit operable by the diver to control a thrust output of the at least one electronic motor propulsor, the method of propelling the diver propulsion device comprising the diver making a selection from the list of the following:
   A) heaving and pitching the diver propulsion device, by the diver,
   B) electric motor propulsion of the diver propulsion device, and,
   C) electric motor propulsion of the diver propulsion device, simultaneously with heaving and pitching of the diver propulsion device, by the diver.

6. A diver propulsion device for hydrofoil-flying a diver upon the sea surface and for diving below the sea surface and towing the diver under the sea, the diver propulsion device comprised of:
   A) a hydrofoil-wing, the hydrofoil-wing having a wing-span, a wing-chord, and a wing-thickness and, wherein the wing-span approximates a height of the diver and the wing-chord approximates a shoulder-width of the diver at a center of the wing-span, and the hydrofoil-wing is made, on the whole, of a combination of materials having a density less than the density of water, wherein the hydrofoil-wing is convex upon an upper surface of the hydrofoil-wing and substantially flat upon a lower surface of the hydrofoil-wing,
   B) at least one electric motor propulsor, and the at least one electric motor propulsor attaches a lower surface of the hydrofoil-wing,
   C) a leash interconnecting the hydrofoil-wing and a wrist of a diver, and
   D) the leash comprises a control circuit of the at least one electric motor propulsor and the control circuit electrically connects the at least one electric motor propulsor and an electric control knob, and the electric control knob integrates a wrist strap of the leash.

* * * * *